US010089597B2

(12) United States Patent
Cortes et al.

(10) Patent No.: US 10,089,597 B2
(45) Date of Patent: Oct. 2, 2018

(54) SHIPPING RACK ITEM CONFIGURATION

(71) Applicant: FLOWVISION, LLC, Dillon, CO (US)

(72) Inventors: Gerson Cortes, Boca Raton, FL (US);
Michael Henderson, Parker, CO (US);
David Pytel, Dillon, CO (US); John Denzel, Mountain View, CA (US)

(73) Assignee: Flowvision, LLC, Dillon, CO (US)

( * ) Notice: Subject to any disclaimer, the term of this patent is extended or adjusted under 35 U.S.C. 154(b) by 617 days.

(21) Appl. No.: 14/615,540

(22) Filed: Feb. 6, 2015

(65) Prior Publication Data

US 2016/0232477 A1    Aug. 11, 2016

(51) Int. Cl.
G06Q 30/00     (2012.01)
G06Q 10/08     (2012.01)
G06Q 30/06     (2012.01)

(52) U.S. Cl.
CPC ....... *G06Q 10/087* (2013.01); *G06Q 30/0635* (2013.01)

(58) Field of Classification Search
CPC ........................ G06Q 10/087; G06Q 30/0635
USPC ..................................................... 705/26, 27
See application file for complete search history.

(56) References Cited

U.S. PATENT DOCUMENTS

| 6,164,537 | A * | 12/2000 | Mariani | A01G 9/143 |
| | | | | 235/383 |
| 8,930,235 | B2 * | 1/2015 | Mihic | G06Q 10/06313 |
| | | | | 705/7.29 |
| 2004/0133483 | A1 * | 7/2004 | Potter | G06Q 10/087 |
| | | | | 705/28 |
| 2008/0193247 | A1 * | 8/2008 | Zupancich | B65D 19/10 |
| | | | | 410/92 |
| 2011/0276364 | A1 * | 11/2011 | Bergstrom | G06Q 10/04 |
| | | | | 705/7.29 |
| 2015/0206098 | A1 * | 7/2015 | Muench | G06Q 10/0835 |
| | | | | 705/337 |
| 2016/0342931 | A1 * | 11/2016 | Muench | G06Q 10/083 |

OTHER PUBLICATIONS

SBI Software: Internet Archive Wayback Machine, www.archive.org; www.sbigrower.com, 2011-2012; 12pgs.*
Anonymous: "Solving Modern Problems," Greenhouse Grower 29.12;46-48, Oct. 2011; ProQuest Dialog #904427636, 6pgs.*
Wright, Janeen: "Is Lean Flow the Competitive Edge You Need?" Greenhouse Grower 32.11: 40,42,44. Meister Media Worldwide. (Mid-Sep. 2014).*

* cited by examiner

*Primary Examiner* — Robert M Pond
(74) *Attorney, Agent, or Firm* — Marsh Fischmann & Breyfogle LLP; Jonathon A. Szumny

(57) ABSTRACT

Utilities that allow for configuring rack space in a growing operation. In one aspect, a utility for generating a rack sheet report is disclosed that indicates a determined quantity of a plurality of inventory items to be disposed on each shelf of a rack for use in loading a vehicle with the plurality of inventory items in an economically efficient manner. Additionally, the present disclosure includes embodiments that relate to generating a maser pull report that includes total quantities of each identified common instance of the plurality of inventory item objects in a master pull group object for use in harvesting or otherwise collecting the plurality of inventory items from the growing operation and loading the plurality of inventory items into a vehicle in a coordinated manner (e.g., based on a priority value).

24 Claims, 18 Drawing Sheets

FIG. 15

SHIPPING RACK ITEM CONFIGURATION

FIELD OF INVENTION

The present disclosure relates generally to logistics systems such as that used to configure inventory (e.g., plants) on a shipping rack.

BACKGROUND

In many growing operations (e.g., a nursery, greenhouse, farm, etc.), workers may fulfill various requests for inventory items by locating a particular inventory item and loading it onto a vehicle for delivery to a requesting customer. In some instances, multiple requests for a plurality of inventory items may be grouped in a particular order destined for delivery to a common location. The plurality of inventory items may be distributively disposed throughout, for example, a field of a growing operation such that a worker may expend substantial time and energy harvesting or otherwise collecting the plurality of inventory items needed to fulfill the particular order. Moreover, the plurality of inventory items for the particular order may not be readily loadable on to a vehicle in an economically efficient manner (e.g., loading too few inventory items onto a vehicle) due in part to the dynamically variable geometry of the living inventory (i.e., live plants).

It is often desirable to load a vehicle with inventory in an economically efficient manner. Traditionally, this involved an ad hoc determination, for example, by a worker at a loading dock, which specified the placement of inventory items in a vehicle on a just-in-time basis. Because it may be difficult for such traditional methods to account for a multitude of parameters, the loaded vehicle may contain a substantial amount of surplus shipping space, which may cause a growing operation to "ship air" at great expense.

SUMMARY

In view of the foregoing, the present disclosure is generally related to utilities (e.g., systems, methods, etc.) for use in automatically determining one or more manners of loading inventory items onto shipping racks and/or configuring the shipping racks themselves in a growing operation (e.g., a nursery, a farm, and/or any other operation in which plants are grown and harvested) that limit the extent to which air is shipped at great expense, facilitate efficient harvesting of inventory items from field, facilitate efficient loading of shipping racks, and the like. In certain embodiments described herein, the utilities may facilitate the generation of a rack sheet report that indicates a determined quantity of a plurality of inventory items to be disposed on each shelf of a rack for use in loading a vehicle with the plurality of inventory items in an economically efficient manner. Additionally, the present disclosure includes embodiments that relate to generating a master pull report that includes total quantities of each identified common instance of the plurality of inventory item objects in a master pull group object for use in harvesting or otherwise collecting the plurality of inventory items from the growing operation and loading the plurality of inventory items into a vehicle in a coordinated manner (e.g., based on a priority value). The generated rack sheet and master pull report facilitate economically efficient harvesting and loading of inventory (e.g., plants) items in a growing operation by providing new logistical tools for use in a growing operation.

The disclosed utilities may employ an order collection module to receive one or more order objects that include a request for a plurality of inventory items from a growing operation. The received order objects may be used by an optimization module, for example, to determine a total number of a plurality of racks to hold the plurality of inventory items of the first order object as well as a quantity of the plurality of inventory items to be disposed on each of a plurality of shelves of each of the determined total number of racks (e.g., based on the dimensions of the rack and inventory items, a degree to which a user wants to minimize air space or keep common inventory items together on a rack, and/or the like). In this regard, the disclosed utilities may generate, for each rack of the determined total number of racks of the first order object, a rack sheet report that indicates the determined quantity of the plurality of inventory items to be disposed on each shelf of the rack. In some embodiments, the disclosed utilities may be operable to generate a master pull report based on a master pull group that includes total quantities of each of the identify common instances of the plurality of inventory item objects associated with a master pull group object.

As such, a first aspect of the present disclosure includes a method for configuring rack space utilization in a growing operation. The method includes receiving, at a processor of a server, a first order object that includes a request for a plurality of inventory items from the growing operation. The method further includes determining, by the processor of the server for the first order object based on the request a total number of a plurality of racks to hold the plurality of inventory items of the first order object, and a quantity of the plurality of inventory items to be disposed on each shelf of a plurality of shelves of each of the determined total number of racks. The method further includes generating, for each rack of the determined total number of racks for the first order object, a rack sheet report that indicates the determined quantity of the plurality of inventory items to be disposed on each shelf of the rack.

A number of feature refinements and additional features are applicable in the first aspect. These feature refinements and additional features may be used individually or in any combination. As such, each of the following features that will be discussed may be, but are not required to be, used with any other feature combination of features of the first aspect.

For example, in an embodiment, the method may further include accessing, by the processor of the server, a customization record that includes at least one configuration parameter of the plurality of racks such that the determining step is based on the accessed customization record. Notably, the at least one configuration parameter of the plurality of racks may include one or more dimensions of the racks. The customization record may also include at least one physical characteristic of the plurality of inventory items. In this regard, the at least one physical characteristic of the plurality of inventory items may include a height for each of the plurality of inventory items such that the determining step includes determining, with the processor, a total number of shelves for each of the total number of racks based on the heights of the plurality of inventory items.

In some embodiments, the customization record may include a height range for each of the plurality of inventory items such that the height of each inventory item may include a portion of the height range of the inventory item. In this regard, the portion of the height range of the inventory item may be one of a lowest end, a median, or a highest end of the height range. The customization record may include a rack sort order preference attribute that indicates an order in which the plurality of inventory items may be loaded onto the plurality of shelves of the plurality of racks. In some instances, the rack sort order preference attribute may correspond to loading inventory items onto the plurality of shelves starting from a bottom-most one of the shelves according to an increasing or decreasing height of the inventory items. In other instances, the rack sort order preference attribute may correspond to grouping common ones of the plurality of inventory items on the plurality of shelves.

In an embodiment, the request for the plurality of inventory items may include a plurality of requests for a plurality of different types of inventory items such that the determining step includes determining a quantity of at least one of the plurality of different types of inventory items to be disposed on each of the plurality of shelves. In this regard, the determined quantities of the at least one of the plurality of different types of inventory items to be disposed on each of the plurality of shelves may be based on a preference to reduce the total number of the plurality of racks needed to hold the plurality of inventory items. In other instances, the determined quantities of the at least one of the plurality of different types of inventory items to be disposed on each of the plurality of shelves are based on a preference to group common ones of the plurality of different types of inventory items together on common ones of the plurality of shelves. The method may further include determining, for at least a first shelf of one of the racks, a first quantity of a first of the plurality of different types of inventory items to be disposed on the first shelf and a second quantity of a second of the plurality of different types of inventory items to be disposed on the first shelf.

In an embodiment, the method may further include receiving, at the processor of the server, at least a first inventory load object such that the first inventory load object includes a total quantity of the plurality of inventory items of the first order object. In this regard, the plurality of inventory items of the first order object may include a plurality of different types of inventory items such that the first inventory load object includes the total quantities of each of the plurality of different types of inventory items.

In another embodiment, the method may further include receiving, at the processor of the server, a plurality of inventory load objects such that each of the inventory load objects may include total quantities of each of the plurality of different types of inventory items for each of a plurality of inventory order objects. Notably, according to one embodiment, each of the inventory load objects may be associated with one of a plurality of priority numbers. The method may further include grouping, using the processor, inventory items of the plurality of inventory load objects having common priority numbers into a plurality of master pull group objects. The method may further include identifying, with the processor, for each master pull group object, common instances of the plurality of different types of inventory items of the master pull group object. The method may further include generating, with the processor, for each master pull group, a master pull report that includes total quantities of each of the identified common instances of the plurality of different types of inventory item objects in the master pull group object.

In an embodiment, the method may further include collecting quantities of inventory items corresponding to the total quantities of the identified common instances of the plurality of different types of inventory item of a first of the plurality of master pull group objects. The method may further include loading the collected quantities of inventory items of the first master pull group object onto a vehicle. Additionally, the step of loading the collected quantities of inventory items of the first master pull group object onto a vehicle may further include loading the collected quantities of inventory items of the first master pull group object onto a plurality of racks. The step of loading the collected quantities of inventory items of the first master pull group object onto a vehicle may also include loading the plurality of racks onto the vehicle. In this regard, the plurality of racks onto which the collected quantities may be loaded is the determined total number of racks. Moreover, the step of loading the collected quantities of inventory items of the first master pull group object onto the plurality of racks may include using the rack sheet reports to load the determined quantities of the collected quantities onto the plurality of shelves of the plurality of racks. In other instances, the step of loading the plurality of racks onto the vehicle includes using the rack sheet report to determine a load sequence parameter indicative of a sequence in which the collected quantities of inventory items are loaded onto the vehicle.

In a second aspect of the present disclosure, a method of managing inventory workflow in a growing operation is disclosed. The method includes receiving, at a processor, a plurality of inventory load objects such that each inventory load object may include a plurality of inventory item objects. Notably, each inventory load object may be associated with one of a plurality of priority numbers. The method includes grouping, using the processor, inventory item objects of the plurality of inventory load objects having common priority numbers into a plurality of master pull group objects. The method may include identifying, with the processor, for each master pull group object, common instances of the plurality of inventory item objects of the master pull group object. The method may include generating, with the processor, for each master pull group, a master pull report that includes total quantities of each of the identified common instances of the plurality of inventory item objects in the master pull group object.

A number of feature refinements and additional features are applicable in the second aspect. These feature refinements and additional features may be used individually or in any combination. As such, each of the following features that will be discussed may be, but are not required to be, used with any other feature combination or features or the second aspect.

For example, the method may further include collecting quantities of inventory items corresponding to the total quantities of the identified common instances of the plurality of inventory item objects of a first of the plurality of master pull group objects. The method may further include loading the collected quantities of inventory items of the first master pull group object onto a vehicle. The method may further include collecting quantities of inventory items corresponding to the total quantities of the identified common instances of the plurality of inventory item objects of a second of the plurality of master pull group objects. The method may further include loading the collected quantities of inventory items of the second master pull group object onto a vehicle. Notably, the first master pull group may be associated with a first of the plurality of priority numbers and the second master pull group may be associated with a second of the plurality of priority numbers. Furthermore, the first priority number may be of a greater priority than the second priority number such that the step of loading the collected quantities of inventory items of the first master pull group object onto the vehicle has priority over the step of loading the collected quantities of inventory items of the second master pull group object onto the vehicle. In other embodiments, the first plurality of priority numbers and the second plurality of priority numbers may at least partially be based on a load sequence parameter indicative of a sequence in which the collected quantities of inventory items are loaded onto the vehicle.

In an embodiment, the step of loading the collected quantities of inventory items of the first master pull group object onto a vehicle may further include loading the collected quantities of inventory items of the first master pull group object onto a plurality of racks. The step of loading the collected quantities of inventory items of the first master pull group object onto a vehicle may also include loading the plurality of racks onto the vehicle. In some instances, before the step of loading the collected quantities of inventory items of the first master pull group object onto the plurality of racks, the method may further include generating, with the processor, a plurality of rack sheet reports for each respective one of the plurality of racks such that each rack sheet report identifies a subset of the collected quantities of inventory items of the first master pull group to be loaded onto the respective rack. In this regard, each rack sheet report may indicate an order in which the respective rack may be loaded onto the vehicle relative to other ones of the racks of the first master pull group object. As such, each of the plurality of inventory load objects includes a plurality of inventory order objects such that each inventory order object of one of the inventory load objects includes a subset of the plurality of inventory item objects of the inventory load object.

In an embodiment, the method may further include collecting quantities of inventory items corresponding to the total quantities of the identified common instances of the plurality of inventory objects of a first of the plurality of master pull group objects. The method may further include collecting quantities of inventory items corresponding to the total quantities of the identified common instances of the plurality of inventory objects of a second of the plurality of master pull group objects. According to one embodiment, the first master pull group may be associated with a first of the plurality of priority numbers such that the second master pull group is associated with a second of the plurality of priority numbers. Notably, the first priority number may be of a greater priority than is the second priority number such that the step of collecting the quantities of inventory items corresponding to the total quantities of the identified common instances of the plurality of inventory objects of the first of the plurality of master pull group objects occurs after the step of collecting quantities of inventory items corresponding to the total quantities of the identified common instances of the plurality of inventory objects of the second of the plurality of master pull group objects. In other embodiment, the collecting includes harvesting the quantities of inventory items in a field or greenhouse of the growing operation.

DESCRIPTION OF THE DRAWINGS

For a more complete understanding of the present invention and further advantages thereof, reference is now made to the following Detailed Description, taken in conjunction with the drawings, in which:

FIGS. 3-15 illustrates various screenshots of a user interface of a portal of the system of FIG. 1, according to one embodiment.

DETAILED DESCRIPTION

Figure 1:
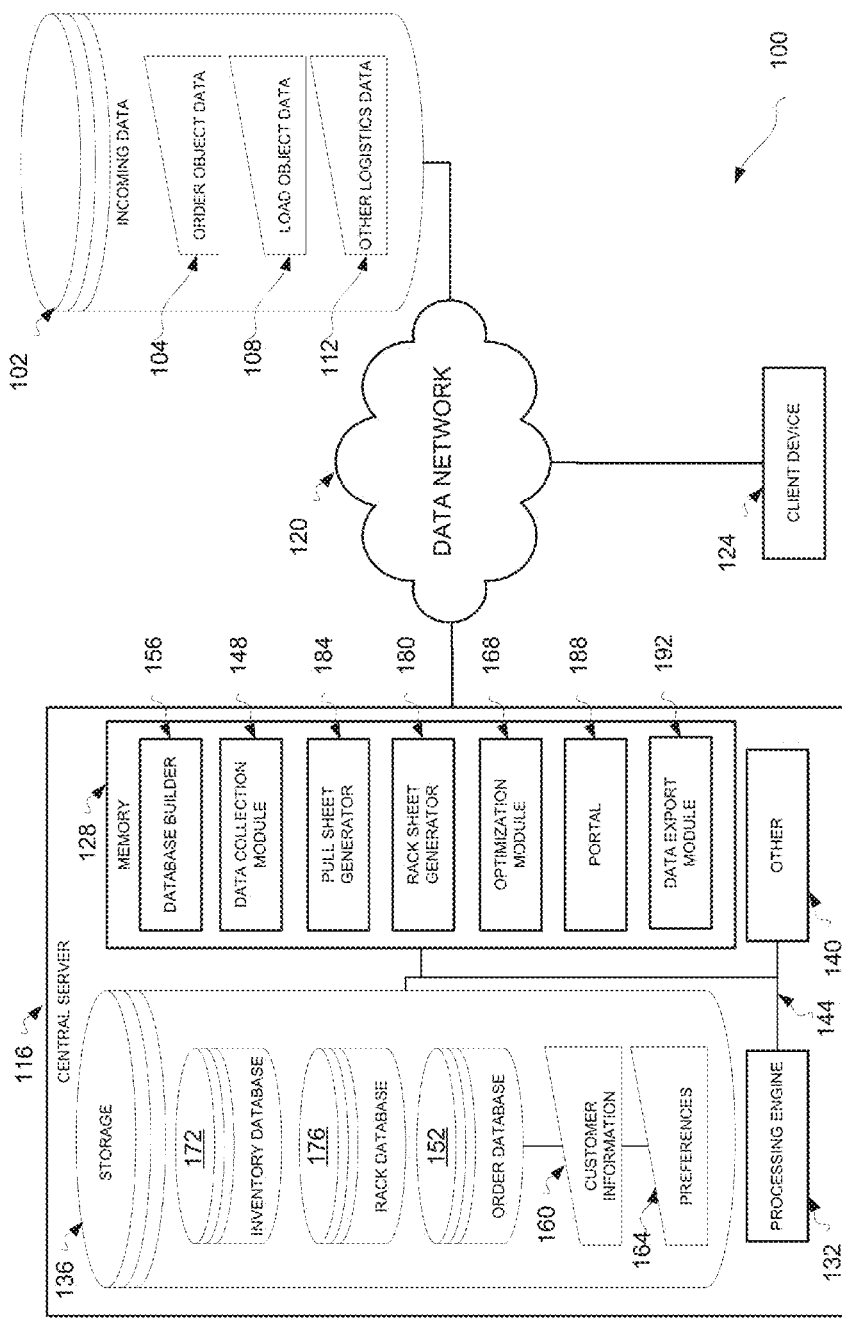
FIG. 1 is a functional block diagram of a system for optimizing rack space utilization in a commercial growing operation, according to one embodiment.

Disclosed herein are utilities (e.g., systems, processes, etc.) for configuring rack space utilization in a growing operation (e.g., a nursery, a farm, and/or any other operation in which plants are grown and harvested). The disclosed utilities may employ an order collection module to receive one or more order objects that include a request for a plurality of inventory items from a growing operation. The received order objects may be used by an optimization module, for example, to determine a total number of a plurality of racks to hold the plurality of inventory items of the first order object. The optimization module may also be operable to determine a quantity of the plurality of inventory items to be disposed of each shelf of a plurality of shelves of each of the determined total number of racks. In one embodiment, the disclosed utilities may generate, for each rack of the determined total number of racks of the first order object, a rack sheet report that indicates the determined quantity of the plurality of inventory items to be disposed on each shelf of the rack. In some embodiments, the disclosed utilities may be operable to generate a master pull report based on a master pull group that includes total quantities of each of the identify common instances of the plurality of inventory item objects associated with a master pull group object.

The disclosed utilities may facilitate the efficient harvesting and shipping of plants in a growing operation. For example, assume a logistics team or the like determines that all the inventory items of a first plurality of load objects need to be loaded into a common vehicle. In this regard, the logistics team may instruct the utilities (e.g., via a user interface) to assign the first plurality of load objects to a first master pull group. The logistics team may also assign additional pluralities of load objects to additional respective master pull groups.

The utilities may then automatically group or associate, for each master pull group, common instances of inventory items across the plurality of loads of the master pull group and generate a respective corresponding master pull report that includes the total quantities of each of the identified common instances. Each master pull report facilitates the harvesting of inventory items (e.g., plants) in a coordinated manner allowing common instances of inventory items across a plurality of load objects to be collected at a substantially common time, rather than being repetitively individually located (particularly where the common instances of inventory items may be located in a common location of the growing operation). The collected inventory items of each master pull group can be brought to or otherwise disposed at a "supermarket" (i.e., some designated location), discussed in greater detail below, at which point the generated rack sheets can be used to load the inventory items onto racks for each particular load object.

As a further example, due at least in part to the fact that the rack sheet includes a configured disposition of the plurality of inventory items on the plurality racks, the rack sheet may facilitate shipping the plurality of inventory items in an efficient manner, which may thereby reduce costs. As an illustration, the rack sheet may configure the disposition of the inventory items on the plurality of racks with a preference to reduce the total number of the plurality of racks needed to hold the plurality of inventory items. As such, the rack sheet may be utilized by a worker in the growing operation to load the various racks with the plurality of inventory items in a manner that efficiently utilizes the total available rack space. In this regard, the disclosed utilities substantially improve growing operation technology by increasing, for example, the volume of plants a growing operation may harvest and ship. That is, the utilities may facilitate a new growing operation paradigm in which more plants may be harvested and shipped at a substantially common time due in part to the foregoing disclosed significant efficiencies facilitated by, for example, the generated rack sheet report and master pull group report.

Reference will now be made to the accompanying drawings, which assist in illustrating the various pertinent features of the various novel aspects of the present disclosure. The following description is presented for purposes of illustration and description. Furthermore, the description is not intended to limit the inventive aspects of the forms disclosed herein. Consequently, variations and modifications commensurate with following teachings, and skill and knowledge of the relevant art, are within the scope of the present invention.

In this regard, FIG. 1 presents a functional block diagram of an illustrative distributed network 100 in which various data attributes may be received and/or accessed to facilitate configuring the rack space utilization in a growing operation. Broadly, the distributed network 100 may include any appropriate hardware (e.g., computing devices, data centers, switches), software (e.g., logic, computer readable instruction, applications system programs, engines), network components (e.g., communication path interfaces, routers), and the like (not necessarily shown an interest of clarity) for use in facilitating any appropriate operations of the network. The distributed network 100 may include multiple types of sources of incoming data 102; namely, order object data 104, load object data 108, other logistical data 112, and/or the like.

In one embodiment, a central server 116 is configured to receive and process the incoming data 102 transmitted over one or more data networks 120 (e.g., a WAN, a LAN, and/or the Internet) in order to support configuring rack space utilization in a growing operation. For instance, order object data 104 may include a request for a plurality of inventory items from the growing operation, load object data 108 may include a plurality of orders, and other logistical data 112 may include priority data. As used herein, the term "object" signifies any appropriate data structure that may be transmitted over the one or more networks 120 and stored in an appropriate computing storage (e.g., storage 136).

The receipt, processing, and storage of each of the foregoing data types may facilitate creating a rack sheet for configuring rack space utilization in a growing operation. For example, in one embodiment, the central server 116 may determine a total number of a plurality of racks to hold the plurality of inventory items of a first order object (e.g., a first itemized table of inventory items received by a growing operation from a customer (e.g., a retailer)). As discussed in greater detail below, each of the plurality of racks may be configured to house a particular amount of inventory items based on a number of factors, including the geometry of the rack, the number of shelves disposed within the rack, characteristics of the inventory items (e.g., quantity, dimensions, plant growth rates, etc.) and the like. The central server 116 may also determine a quantity of the plurality of inventory items to be disposed on each shelf of a plurality of shelves of each of the determined total number of racks. In this regard, the central server 116 may associate each of the plurality of inventory items of an order with a particular shelf and a particular rack. In response to the determined total number of the plurality of racks, and the quantity of the plurality of inventory items to be exposed on each shelf, the central server 116 may generate a rack sheet report that indicates the determined quantity of the plurality of inventory items to be disposed on each shelf of the rack. The generated rack sheet report may, for example, be displayed via user interface 124 via the one or more data networks 120 and/or printed out on paper. After the central server 116 has determined the total number of racks and rack configuration in the manner discussed herein, and associated the same with the respective order objects, the order objects may be considered "configured" order objects.

In other embodiments, the central server 116 may receive a plurality of inventory load objects (e.g., load object data 108) that includes a plurality of inventory item objects. For instance, an entity (e.g., a customer, logistics management, etc.) may, after receiving a plurality of configured order objects, appropriately group the order objects into a plurality of inventory load objects. Each inventory load object may be associated with one of a plurality of priority numbers representing a sequence in which actual inventory items represented by the inventory load objects are to be harvested by the growing operation, loaded onto a vehicle, etc. The central server 116 may be operable to group inventory item objects of the plurality of inventory load objects having common priority numbers into a plurality of master pull group objects. In this regard, the central server 116 may facilitate coordinated collecting of quantities of inventory items that correspond to common priority numbers. Moreover, the central server 116 may be operable to identify, for each master pull group object, common instances of the plurality of entry item objects of the master pull group object. In this regard, the central server 116 may generate, for each master pull group, a master pull report that includes total quantities of each of the identified common instances of the plurality inventory item objects in the master pull group object. To the extent that the identified common instances of the plurality of inventory item objects are located in a common area of the growing operation, the master pull report may facilitate efficient inventory retrieval for load or order fulfillment (e.g., by identifying the common areas of the inventory items of the associated load or order). The generated pull report may be communicated to user via user interface 124 over the one or more data networks 120.

The central server 116 may generally employ various components to receive and process the incoming data 102 to facilitate configuring rack space utilization in a growing operation. As shown, the central server 116 may include a memory 128 (e.g., RAM, other volatile memory modules, etc.) that contains one or more modules or engines that process incoming data 102; a processing engine 132 (e.g., one or more processors, processing engines, CPUs, etc.) that executes the modules or engines from the memory 128; storage 136 (e.g., one or more magnetic disks, solid-state drives, or other non-volatile memory modules) for storing incoming data 102 and processed data (e.g., configured order objects, master pull group objects, etc.); and a number of other components 140 (e.g., input devices such as a keyboard and a mouse, other devices such as a display and speakers, and the like), all of which may be appropriately interconnected by one or more system buses 144.

The one or more engines of the central server 116 may generally facilitate the processing of the incoming data 102 by performing a plurality of incoming functions and storing resultant data in one or more databases of storage 136 (e.g., for use in generating a rack sheet report or master pull report). Each of the engines (and/or other engines, modules, logic, etc. disclosed and/or encompassed herein) may be in the form of one or more sets of computer readable instructions for execution by the processing engine 132, and may be manipulated by users in any appropriate manner to analyze and configure the order object data 104, load object data 108, and other logistical data 112 as disclosed herein. In this regard, the combination of processing engine 132, memory 128, and/or storage 136 (i.e., machine/hardware components), and the various engine/models disclosed herein in one embodiment create a new machine that becomes a special purpose computer once it is programmed to perform particular functions of the utilities disclosed herein (e.g., pursuant to instructions from program software). While various engines have been depicted in FIG. 1 as being separate and distinct engines, it is understood that the functionalities or instructions of two or more the engines may actually be integrated as part of the same computer-readable instructions set, and that the various engines have been depicted in the manner shown in FIG. 2 merely to highlight various functionalities of the system.

In one arrangement, the central server 116 may include a data collection module 148 that receives the incoming data 102 over the one or more data networks 120 and facilitates the storage of the incoming data 102 in storage 136 in any appropriate manner (e.g., in one or more databases, such as order database 152). In this regard, the order database 152 may store a plurality of order objects, each of which may include a request for a plurality of inventory items from the growing operation (e.g., consider screenshot 700 of FIG. 7, which illustrates a plurality of received order objects, not yet configured as disclosed herein). The central server 116 may also include a database builder 156 that is configured to manipulate the incoming data 102 to configure the efficient utilization of rack space in a growing operation in part by identifying various associations. In some instances, the database builder 156 may associate order object data 104 stored at order database 152 with customer information 160. In this regard, the database builder may be operable to structure the various items of incoming data 102 in a manner in which the optimization module 168, for example, may utilize to generate a rack sheet or master pull report. Customer information 160, discussed in greater detail below, may include geographic information (e.g., the intended destination of a particular order object), or other information specific to the customer of the order object. In some instances, customer information 160 may include a reference to customer preferences 164. As discussed in greater detail below, customer preferences 164 may include one or more configuration parameters for use in configuring the rack space (e.g., a specific type of rack(s) to be used, a height rack calculation, a rack sort order, etc.).

The central server 116 may also include optimization module 168 for use in determining various aspects, which may facilitate the rack space configuration. Specifically, the optimization module 168 may determine a total number of a plurality of racks to hold the plurality of inventory items of a particular order object. In this regard, the optimization module 168 may access order object data 104 stored at the order database 152 in order to determine the number of racks required to physically house the quantity of inventory items associated with, for example, a first order object. Additionally, the optimization module 168 may determine a quantity of plurality of inventory items to be disposed on each shelf of a plurality of shelves of each of the determined total number of racks. In this regard, optimization module 168 may, for example, assign each inventory item associated with the first order object to a particular shelf of the determined number of racks. That is, each rack may comprise a plurality of shelves in a variety of configurations. As such, assignment of each inventory item to a particular shelf of the determined number of racks may be based on a variety of criteria, including, as discussed in greater detail below, customer preferences 164, physical characteristics of the inventory items, geometric configuration of the racks (e.g., such as those stored at inventory database 172 and rack database 176), and/or the like.

In some embodiments, the central server 116 may include a rack sheet generator 184 operable to generate, for each rack of the determined total number of racks for the order object of the order object data 104, a rack sheet report that indicates the determined quantity of the plurality of inventory items to be disposed on each shelf of the rack. The generated rack sheet may facilitate, for example, the loading of a vehicle for delivery of the inventory based on the information of the rack sheet. As an example, a vehicle for delivery of the inventory may be loaded according to various customer preferences (e.g., such as those included in a customization record). In other embodiments, the central server 116 may include a pull sheet generator 184 for generating, as discussed in greater detail below, a master pull report that includes total quantities of each of the identified common instances of the plurality of inventory item objects in the master pull group object. Central server 116 may also include portal 188 (e.g., an Internet or web-based platform), discussed in greater detail below, to facilitate transmitting, for example, information associated with the pull sheet generator 184 and/or the rack sheet generator 182 to client device 124 (e.g., a tablet, laptop, etc.). In some embodiments, incoming data 102 may be received by the central server 116 from the client device 124 via the one or more data networks 120.

Figure 2:
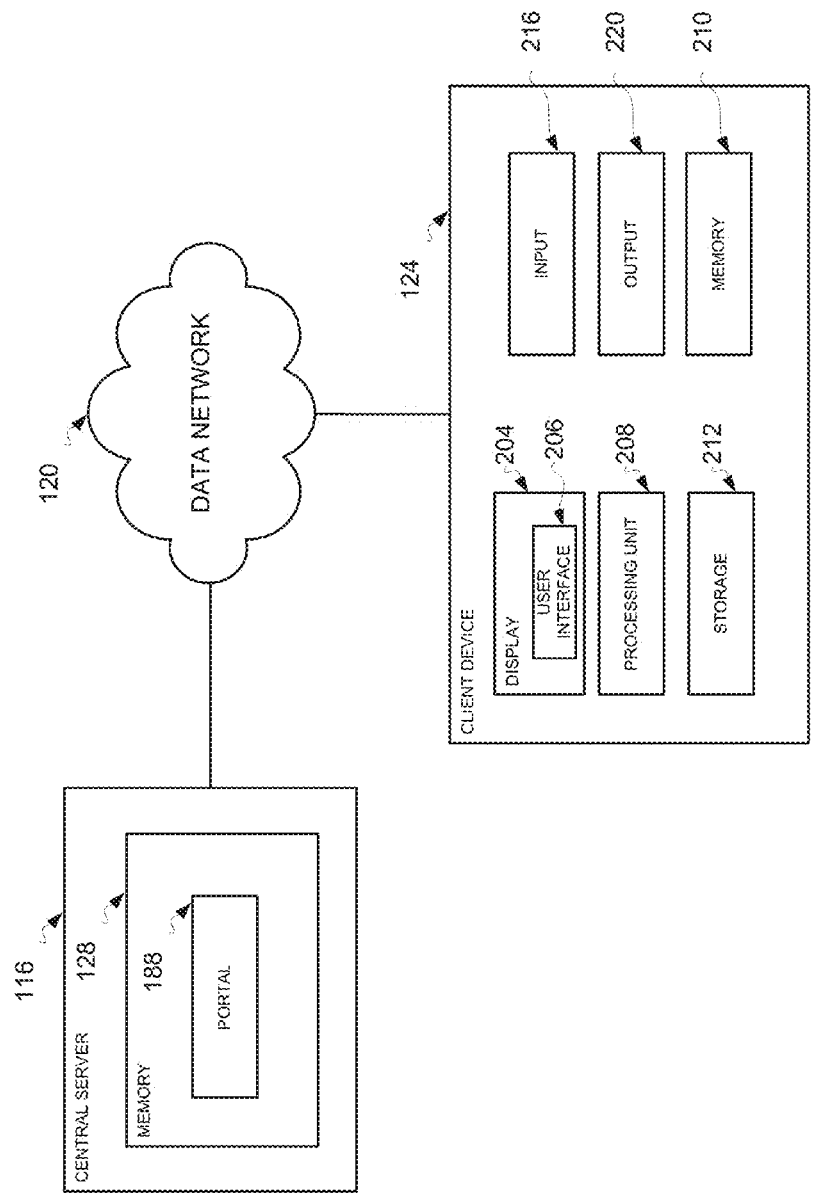
FIG. 2 is more detailed functional block diagram of the user interface of FIG. 1.

Turning next to FIG. 2, a more detailed functional block diagram of the client device 124 is depicted for use in receiving the transmitted information of the central server 116. The client device 124 may generally employ various components to receive the transmitted information. As shown, the client device 124 may include a display 204 (e.g., LCD screen, LED screen, or the like) that presents information associated with the central server 116 to the user via a user interface 206; processing unit 208 (e.g., one or more processors, processing engines, CPUs, etc.) operable to receive the transmitted information; memory 210 (e.g., RAM, other volatile memory, etc.); and storage 212 (e.g., one or more magnetic disks, solid-state drives, or other nonvolatile memory modules) for storing the received transmitted information. Moreover, client device 124 may be operable to receive input 216 (e.g., in response to information presented on display 204) and transmit output 220 (e.g., indicative of a request for information from central server 116). In this regard, central server 116 may transmit information associated with the pull sheet generator 184 and rack sheet generator 182 between the portal 188 and the client device 124 via the one or more data networks 120. For example, this may occur by any appropriate browser (not shown) running on the memory 210 of the client device 124 that may appropriately access the portal 188 via external data network 120 (which may entail entering or providing any appropriate credentials such as username and password).

While reference will now be made to a number of representative screenshots of the portal 188 that may be presented on, for example, display 204 of the client device 124 and that may be manipulated by the user to configure and monitor rack space utilization. It should be understood that the various functionalities disclosed herein are not limited to use with such specific screenshot as presented. Rather, the screenshots are merely provided to facilitate the reader's understanding of the various programs, modules, and other functionalities disclosed herein.

Starting now at FIG. 3, various screenshots of the portal 188 will be presented that broadly provide users with the ability to configure and monitor rack space utilization in a growing operation, including the ability to fulfill orders via a generated pull sheet, discussed in greater detail below. Like many of the other screenshots that will be discussed below, the screenshot 300 in FIG. 3 includes a number of "first-level" buttons 304 (or other types of user-manipulable features), with an associated "second-level" region 308 for use in configuring and monitoring rack space utilization in a growing operation. The first-level buttons 304 may include, for example, a home button 312, an order review button 314, a rack review button 316, a rack summary button 318, a master pull button 320, a forms button 322, an administration button 324, and an about button 326. In one arrangement, the first-level buttons 304 may remain the same throughout the various screenshots while the second-level region 308 may change (to provide access to different functionalities) depending upon which of the first-level buttons 304 have been manipulated. It should be understood, however, that the present disclosure is not limited to the specific arrangements and names of buttons, drop-down menus, and the like shown in the present figures. Rather, these features have only been provided to assist the reader in understanding the various functionalities disclosed herein.

In this screenshot 300, the administration button 324 has been manipulated, which broadly allows a user to program or otherwise establish specific information and preferences to be used by the various functionalities disclosed herein (e.g., and which may be appropriately stored in storage 136). In some instances, the established specific information and preferences may facilitate programming predetermined system parameters upon which the configured rack space may be based. More specifically, FIG. 3 illustrates various utilities that may be presented and accessible to a user upon manipulation of the administration button 324; for instance, an import tools utility 330, a height range calculation utility 334, and a rack sort order utility 338.

The import tools utility 330 may include a number of tools (e.g., buttons or other user manipulable features) such as an import item master tool 342, an import customer information tool 346, an import shelf quantity tool 350, and an import height ID tool 354. Each tool of the import tools utility 330, discussed in greater detail below, may facilitate the importation of data for use in configuring the rack, including automatic and manual data importation. In this regard, the user may manipulate the import tool utility 330 to retrieve incoming data 120 via the data collection module 148. For example, the data collection module 148 may retrieve or receive information associated with customer information in response to manipulation of the customer information tool 346 by a user). In some instances, the database builder 156 may associate the customer information with corresponding orders of the order database 152.

In another embodiment, the data collection module 148 may retrieve information associated with various physical characteristics of inventory items stored at inventory database 172 (e.g., a modified height range). The database builder 156 may associate the retrieved physical characteristics with, for example, an inventory item database record such that the inventory item database record is modified to include the retrieved information. In this regard, a rack sheet may be generated at least in part on the various data items retrieved via import tools utility 330 (e.g., based on a height ID retrieved via the import height ID tool 354).

According to one embodiment, each tool of the import tools utility 330 may trigger the data collection module 148 of FIG. 1 to collect or receive data beneficial to the configuration of a rack. For example, manipulation of the import item master tool 342 may trigger the data collection module 148 to access general information associated with each of the plurality of inventory items and store the information at, for example, inventory database 172. The import customer information tool 346 may trigger the data collection module 148 to retrieve information, for example, associated with an intended destination of an order and store it at customer information 160 of order database 152. The import shelf quantity tool 350 may trigger the data collection module 148 to access information associated with, for example, the geometric configuration of a particular rack, which may subsequently be stored at the rack database 176. The import height ID tool 354 may trigger the data collection module 148 to access a physical characteristic of an inventory item, for example, including the height range of a particular inventory item; this, too, may subsequently be stored, for example, at inventory database 172.

Figure 3:
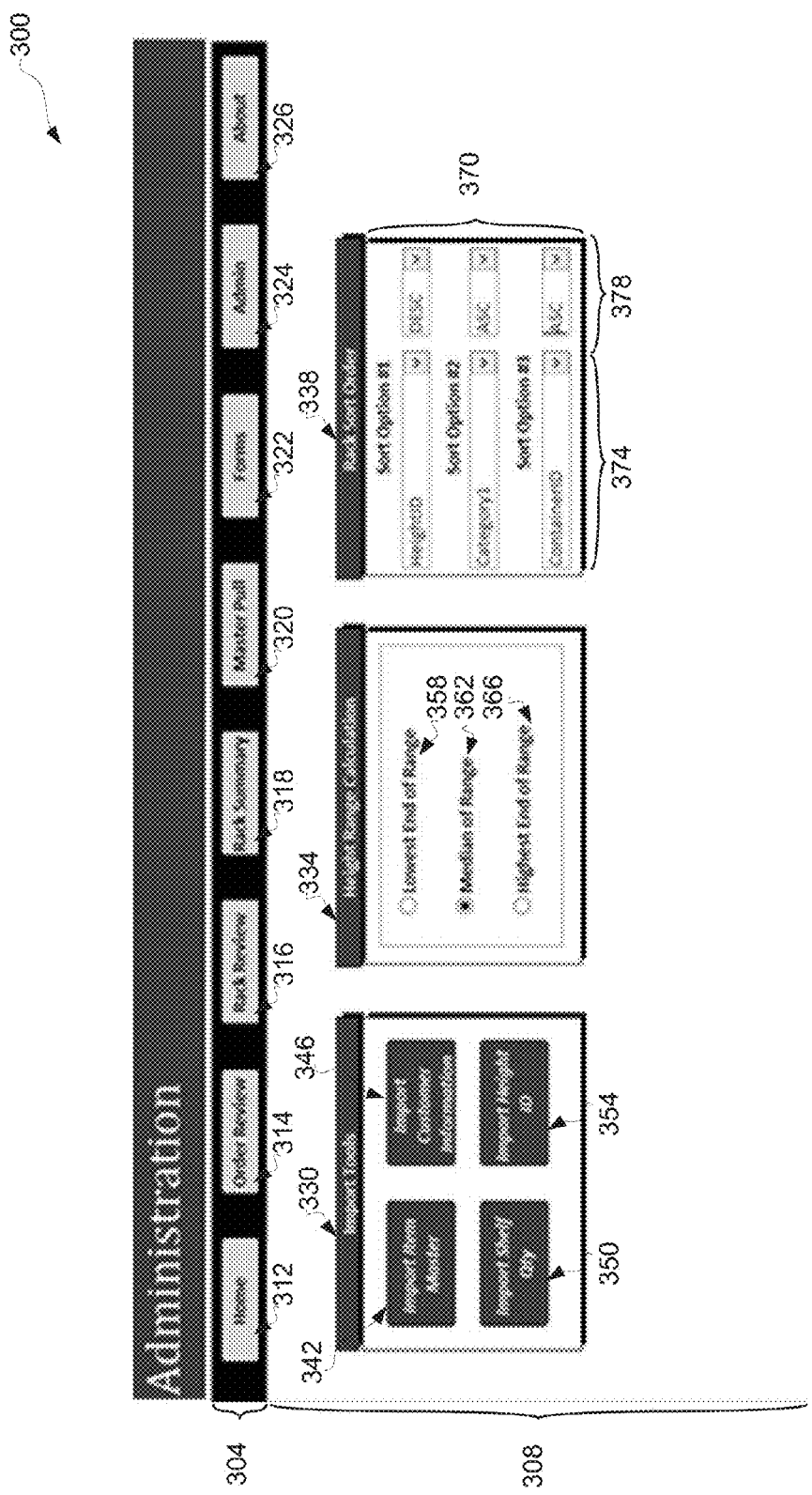
Figure 15:
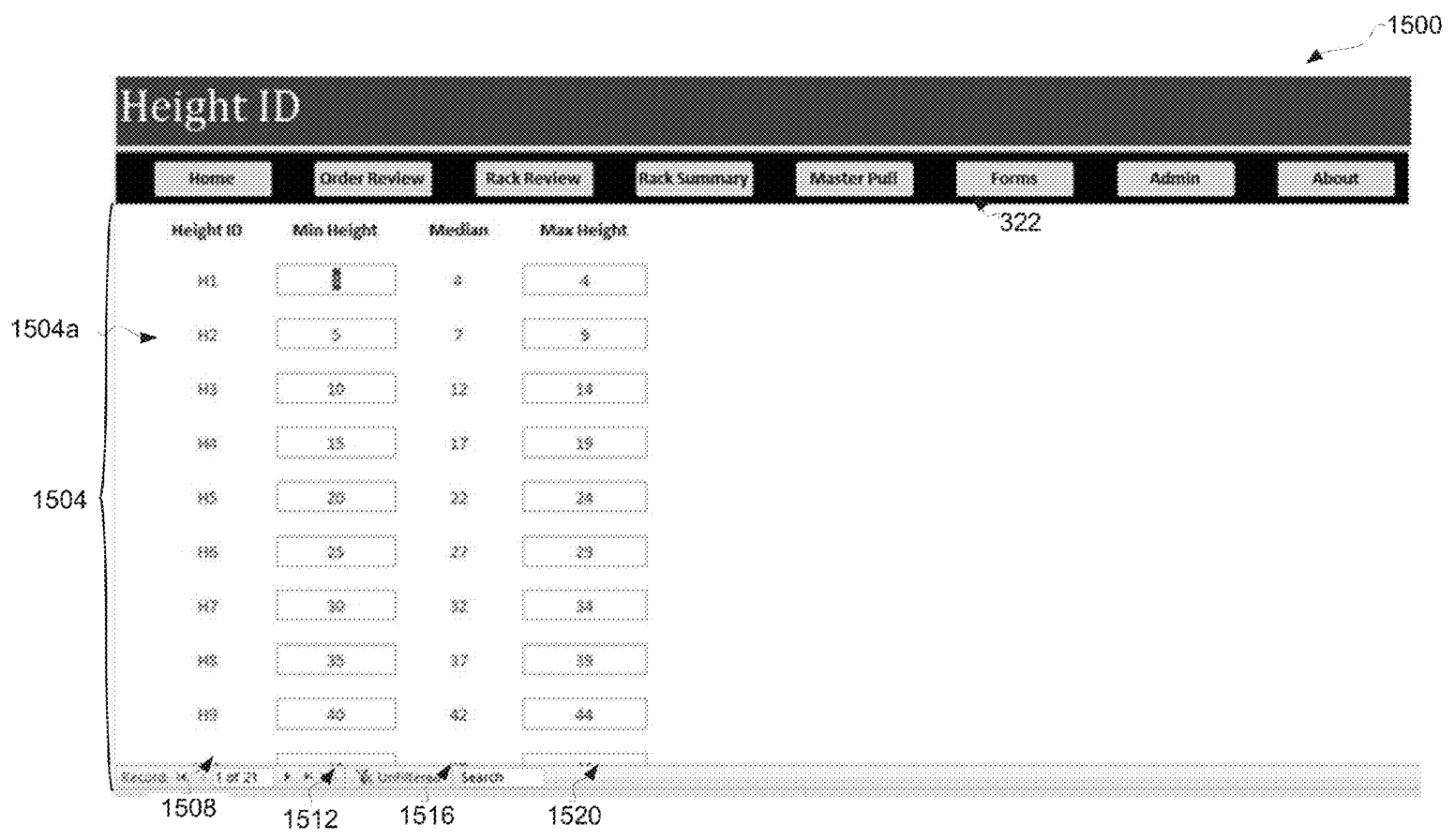

The height range calculation utility 334 of FIG. 3 allows a user to assign a particular portion of the height range to the inventory items to be used in the shipping rack configuration, where the height range corresponds to an assumption about the actual height of the plants. That is, each inventory item for configuration on the rack may be associated with or otherwise assigned a particular height ID (e.g., H1, H2, H3, etc.), where each height ID may be associated with or assigned a particular height range (e.g., consider screenshot 1500 as depicted in FIG. 15). In this regard, a user may manipulate the height range calculation utility 334 to instruct the optimization module 168 as to whether a minimum, median, or maximum height of the height range for each corresponding plant is to be used for configuration of the rack space at least partially based on whether the plant is assumed to be of a minimum, median, or maximum height (as configured according to height ID database interface 1504, discussed in greater detail below). As such, racks may be configured by the selection of the lowest end of range button 358, the median of range button 362, or the highest end of range button 366. In some instances, the particular selected button (e.g., end of range button 358, the median of range button 362, the highest end of range button 366) of the height range calculation utility 334 may be stored, for example, as a preference 164 at order database 152.

Broadly, the highest end of range button 366 may correspond to a rack configuration with a greater probability of including greater space between shelves of a particular rack. In this regard, the highest end of range button 366 may correspond to a configuration setting used by a growing operation that experiences a large variation in the day-to-day growth of the inventory (e.g., as may be the case for a shrub growing late in the season when a lot of trimming and extra growth occurs). The median of range button 362 may result in a tighter spacing of plants on the racks, and subsequently less space between shelves. In this regard, median of range button 362 may correspond to a configuration setting used by a growing operation that experiences typical growth variation (e.g., as defined by a height range, such as that of height ID database interface 1504 as depicted in screenshot 1500). The lowest end of range button 358 may result in the most compact shelf configuration. In this regard, lowest end of range button 358 may correspond to a configuration setting used by a growing operation generally either early in the season (e.g., such as for shrub grower) or throughout the season (e.g., such as for an annual grower) for use with inventory items with less height variation. Notably, the foregoing spacing may result because the actual height of the plants may differ from the selected height range at the height range calculation utility 334 (e.g., consider an instance of selecting the end of range button 358 where the actual height of some plants are of median height, etc.).

The rack sort order utility 338 may include one or more sort options 370 to be used by optimization module 168 when configuring racks from order objects. The one or more sort options 370 may be manipulated via one or more sort option types 374. As depicted, for the sake of illustration, the one or more sort option types 374 may include a height ID type, a category type, in a container ID type, for example. Notably each of the one or more sort option types 374 may be sorted according to a sort option order 378. The sort option order 378 may allow the optimization module 168 to sort inventory disposed on a rack in either ascending or descending order for each of the sort option types 374. In this regard, the central server 116 may determine where a particular item of inventory is to be placed on the rack based on the selected sort option type 374 and the sort option order 378. For example, selecting height ID for sort option type 374 and descending for sort option order 378 may position inventory items on the rack based on the height variable of an inventory item in descending order.

Figure 4:
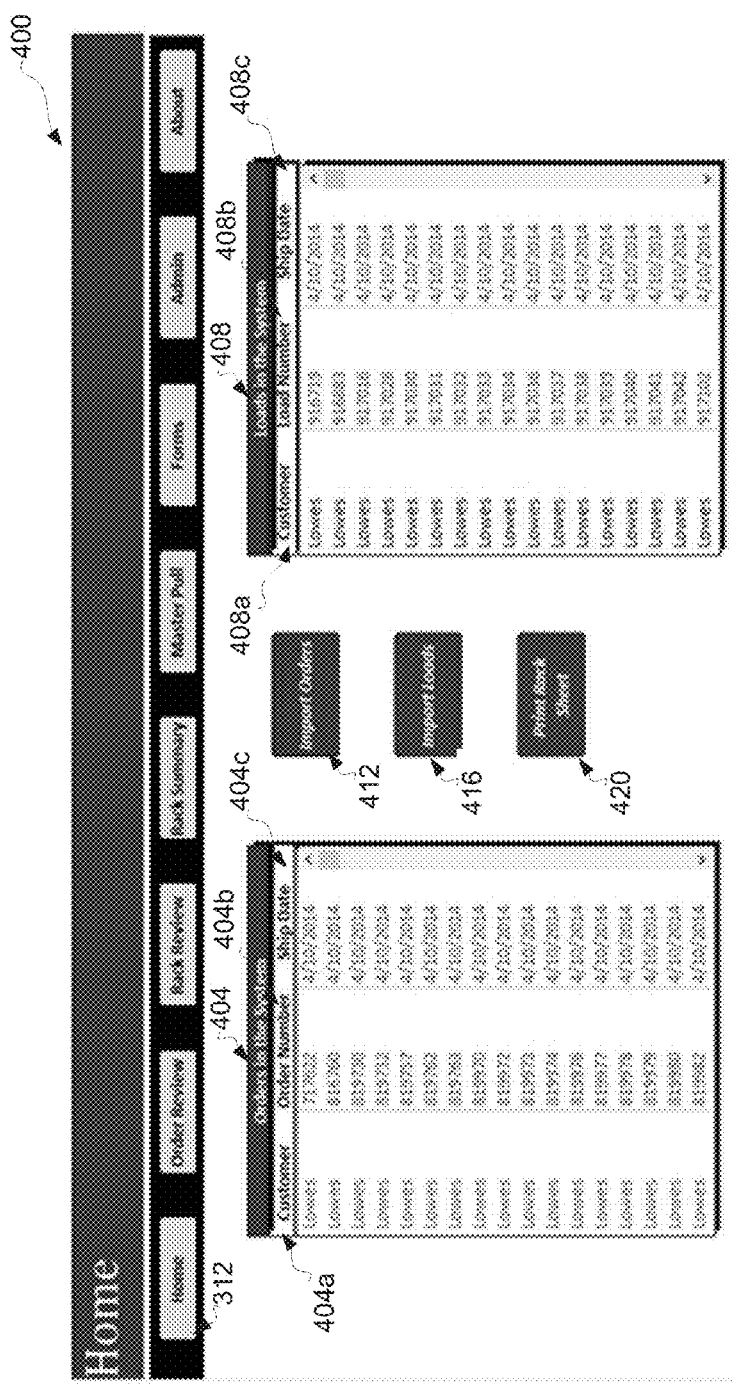

Turning next to FIG. 4, a screenshot 400 is depicted in which the home button 312 has been manipulated such that the second level screen 308 corresponds to information associated with the home button 312. In particular, screenshot 400 may include any orders in the system listing 404 and loads in the system listing 408 (e.g., as stored in order database 152 of FIG. 1). In this regard, screenshot 400 may present the user with information associated with the orders received by the system (e.g., central server 116) and information associated with the loads received by the system. This may include, for example, with respect to orders in the system listing 404, customer information 404a, order number 404b, and ship date 404c. With regards to loads in the system listing 408, this information may include customer information 408a, load number 408b, and ship date 408c. Screenshot 400 may also include an import orders button 412 operable to receive additional orders (e.g., an order associated with the first order object, or order object data 104) such that the additional orders may be added to the orders in the system list 404. Screenshot 400 may also include an import loads button 412 operable to receive additional loads (e.g., a load associated with one of a plurality of inventory load objects) such that the additional loads may be added to the loads in the system list 408. The screenshot 400 may also include a print rack sheet button 420 operable to print a generated rack sheet that indicates the determined quantity of the plurality of inventory items to be disposed on each shelf of the rack.

Figure 7:
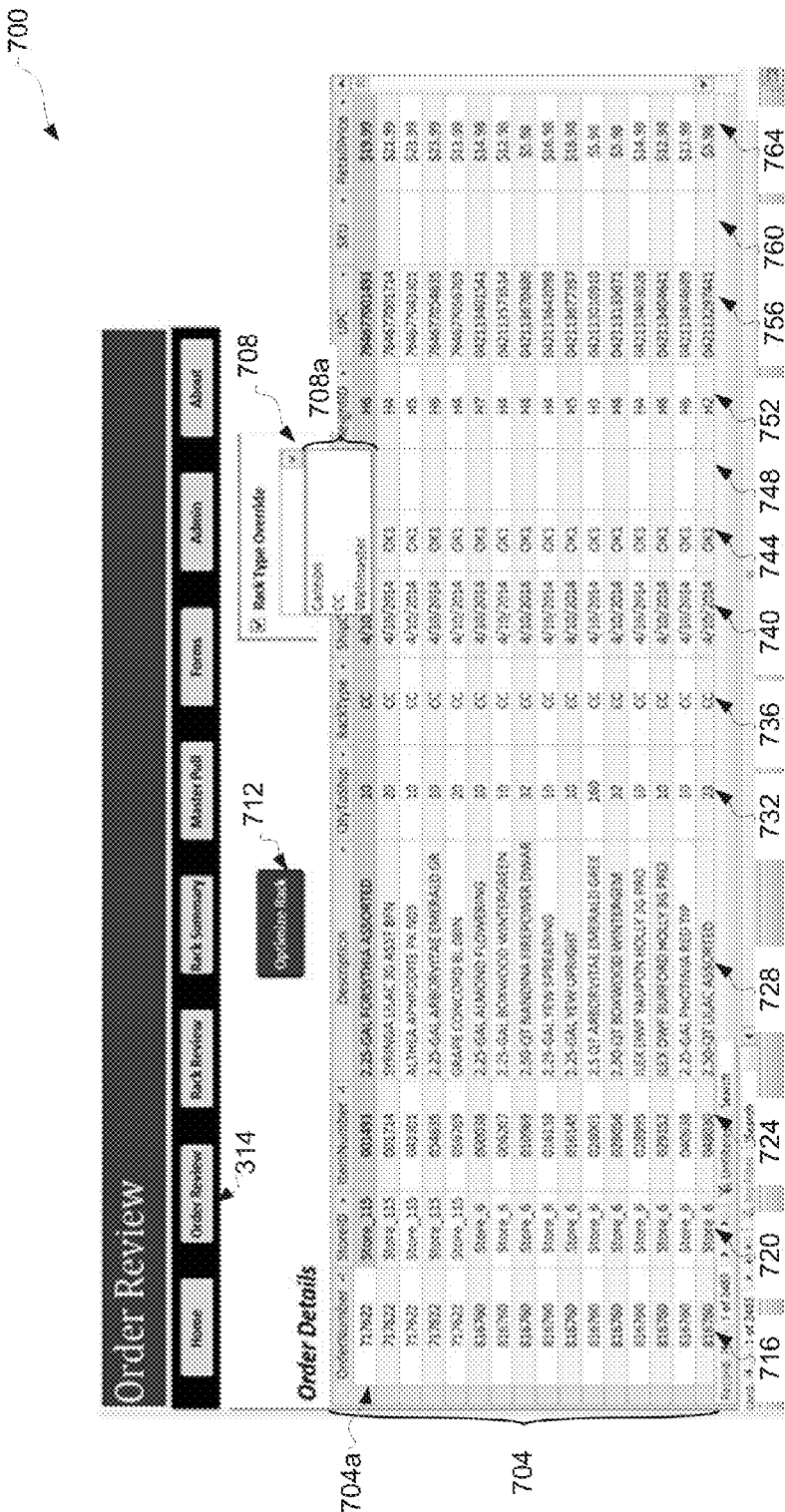

Turning next to FIG. 7, a screenshot 700 is depicted in which the order review button 314 has been manipulated such that the second level region 308 corresponds to information associated with the order review button 314. In particular, the second level region 308 of screenshot 700 may include an order details display 704, a rack type override menu 708, and an optimize rack button 712. In this regard, the order details display 704 may facilitate the review and modification of any orders (e.g., a first order object associated with order object data 104), prior to the configuration or optimization of the rack by the central server 116. As such, the order details display 704 may include detailed information pertaining to the orders received by the central server 116 (e.g., those stored at order database 152 of storage 136). The order details display 704 may include a plurality of data attributes associated with each order arranged in a series of columns. In one embodiment, the order details display 704 may include an order number column 716, a store ID column 720, an item number column 724, a description column 728, a quantity to ship column 732, a rack type column 736, a ship date column 740, a farm column 744, a zone column 748, a height ID column 752, a UPC column 756, an SKU column 760, and a retail price column 764. As such, the order details display 704 may allow a user, for example, to view the plurality of data attributes prior to optimizing a rack.

The screenshot 700 may also include a rack type override menu 708 operable to modify the type of rack upon which the rack space configuration may be based. As such, the rack type override menu 708 may be operable to modify the rack type column 736 of the order details display 704. As an example, rack type override menu 708 may include a detail drop-down menu 708a, which lists at least one rack type upon which the rack space configuration may be based. In one embodiment, the drop-down menu 708a may include a Canon rack, a CC rack, a well master rack, and/or one or more other rack types of various configurations. For the sake of illustration, consider row 704a of order details display 704. Row 704a (i.e., that associated with order number 717622 and item number 001493) may include a value for the rack type column 736 corresponding to a CC rack, for instance. In one embodiment, selecting a rack from the drop-down menu 708a may change the value of the rack type column 736 associated with row 704a.

The screenshot 700 may also include an optimization rack button 712. Manipulation of the optimize rack button 712 may trigger the optimization module 168 of FIG. 1 to initiate the process of optimizing (e.g., configuring the various racks based on the determined information of the central server 116) the received order objects (e.g., those stored at order database 152 of storage 136) based in part on various parameters such as those in the order objects (e.g., inventory item types and quantities) customer preferences (e.g., rack types, height range parameters, rack sort orders, etc.) and the like. Upon the manipulation of the optimize rack button 712 by the user, the central server 116 may be operable to automatically determine a number of racks for each order and a number of inventory items to be disposed on each shelf of each rack and then display a rack summary page according to one or more algorithms, discussed in greater detail below.

For example, a user may select optimize rack button 712 to optimize a rack according to descending height order. Broadly, inventory items associated with a given order may be sorted starting with the tallest item and proceeding to the shortest item. In this regard, the tallest inventory items may be processed first. Based on the quantity of the tallest inventory items associated with the order, the quantity may be divided by the quantity of inventory items per shelf for that given inventory item such that the number of shelves may then be calculated. Next, the method may proceed by indicating the placement of the inventory item on a rack starting from the bottom-most shelf and proceed upwards towards the top-most shelf (e.g., by recording the same on a virtual rack or the like in any appropriate database or the like).

In other embodiments, a user may select optimize rack button 712 to optimize a rack according to ascending height order. Broadly, inventory items associated with a given order may be sorted starting with the shortest item and proceeding to the tallest item. In this regard, the shortest inventory items may be processed first. Based on the quantity of the shortest inventory items associated with the order, the quantity may be divided by the quantity of inventory items per shelf for that given inventory items such that the number of shelves may be calculated. Next, the method may proceed by indicating the placement of the inventory item on a rack starting from the bottom-most shelf and proceed upwards towards the top-most shelf.

Regardless of whether the optimize rack button 712 facilitates optimizing a rack according to descending or ascending order, the algorithm may proceed such that the next inventory item associated with the order indicates the placement of the inventory item on the second to bottom shelf. The foregoing process may continue until either one of two conditions are met: (i) no more shelves may be associated with the rack; or (ii) the total height of the rack is equal to or greater than the height of the truck into which the rack will be loaded.

Notably, when an inventory item does not consume a full shelf quantity, the algorithm may facilitate creation of a partial shelf. As such, the algorithm may first proceed by reviewing the next inventory item associated with the order and calculating the number of shelves remaining If the inventory item consumes a full shelf, the algorithm may create a partial shelf. If, however, the inventory item consumes a partial shelf, the algorithm may attempt to combine the partial shelf with another allocated partial shelf to facilitate maximum disposition of inventory items on the shelves. In this regard, if the entire quantity of inventory items fits on the partial shelf, it may be combined with the partial shelf—i.e., the single shelf may include at least two partial shelves of different inventory items. However, if the entire quantity of inventory items does not fit on the indicated partial shelf, the algorithm may be operable to create a new partial shelf.

Additionally, when multiple inventory items are disposed on a shelf, the height of the shelf may be based on the tallest item disposed on the shelf. Once the first rack is optimized, multiple subsequent racks may be optimized until the optimization of the order is completed. While certain rack optimization methods have been disclosed, it will be understood that variations and modifications commensurate with the following teachings, skill, and knowledge of the relevant art within the scope of the present invention.

Figure 8:
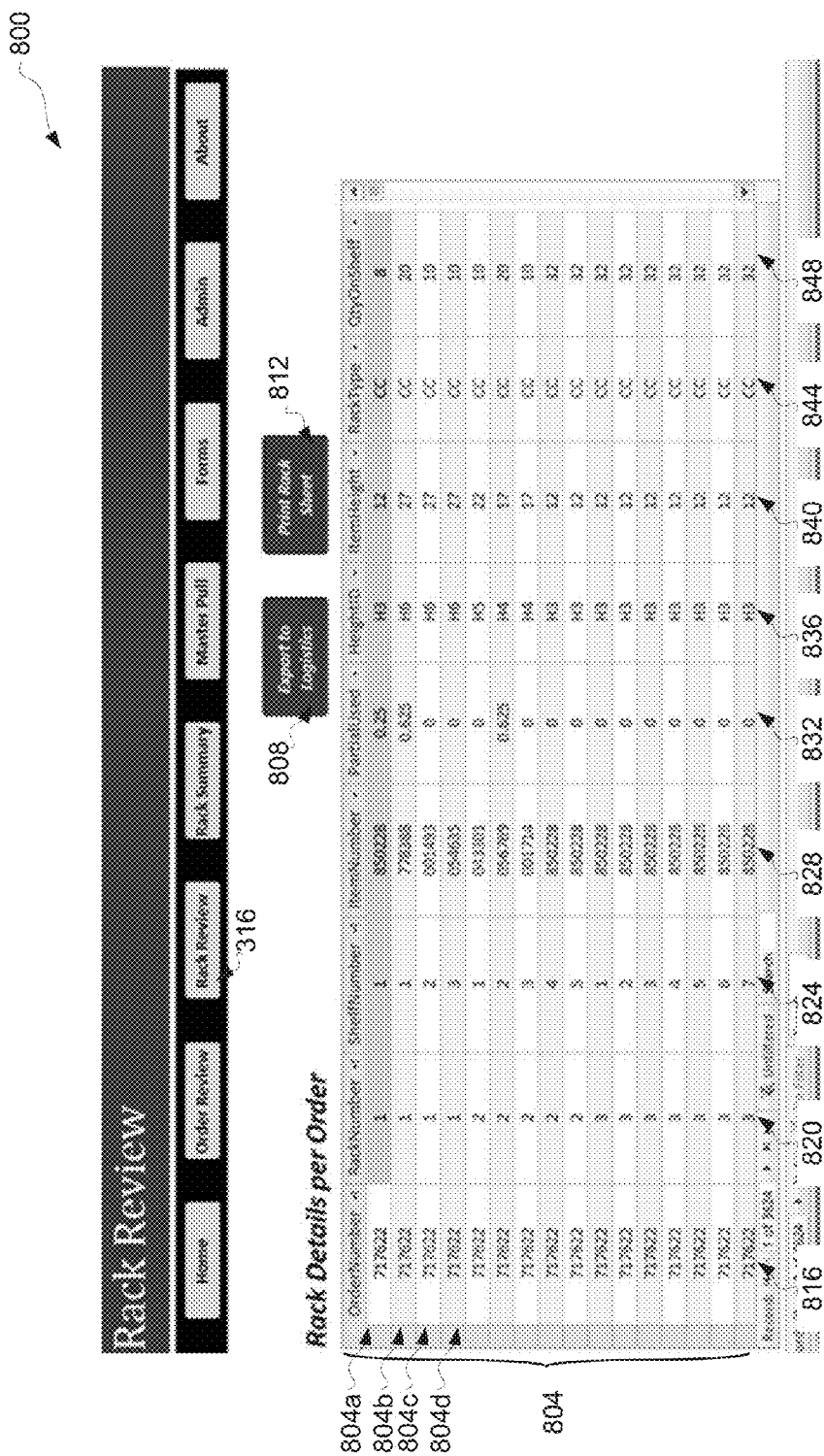

Turning next to FIG. 8, a screenshot 800 is depicted in which the rack review button 316 has been manipulated such that the second level region 308 corresponds to information associated with the rack review button 316. In particular, the second level region 308 of screenshot 800 may include a rack details per order display 804, an export to logistics button 808, and a print rack sheet button 812. In this regard, the rack details per order display 804 may present a plurality of details of the various orders associated with the configured racks arranged in various data columns. As such, rack details per order display 804 may include an order number column 816, a rack number column 820, a shelf number 824, an item number column 828, a partially used column 832, a height ID column 836, an item height column 840, a rack type column 844, and a quantity on shelf column 848.

Notably, the rack details per order display 804, organizes rack configuration on a per order basis. For the sake of illustration, consider the order number 717622 presented in screenshot 800, which illustrates a particular embodiment of a rack space configuration for the order number 717622. Specifically, consider row 804*a*, row 804*b*, row 804*c*, and row 804*d*, which illustrates the disposition of inventory items associated with order 717622 on rack number 1 (e.g., the rack noted in rack number column 820). In this regard, according to this embodiment, rack number 1 may comprise three shelves (e.g., shelf number one, two, and three of shelf number column 824) upon which 48 inventory items (e.g., the cumulative total of inventory item values associated with quantity on shelf column 848 for each of row 804*a*, 804*b*, 804*c*, and 804*d*) are disposed corresponding to four different types of inventory items (e.g., items 850228, 778388, 001493, 054635, according to item number column 828). The rack details per order display 804 also assigns particular inventory items and quantities to particular shelves and corresponding racks. By way of continued example, while the inventory associated with row 804*c* and row 804*d* each may be disposed on a distinct shelf of rack number 1, the inventory items associated with row 804*a* and 804*b* may be disposed on a common shelf. This may be indicated, by reference to shelf number column 824, which indicates that both the inventory associated with row 804*a* and 804*b* reside on shelf 1 of rack 1. Furthermore, the rack details per order 804 may also be operable to display the percentage of a particular shelf quantity of inventory items assumes. By way of further example, and with reference to the partially used column 832, the inventory associated with row 804*a* may be disposed on 25% of the shelf area of shelf number one, and the inventory items associated with row 804*b* may be disposed on 62.5% of the shelf area of shelf number one. Subsequently, the foregoing information of the rack details per order display 804 may be used, for example, to assemble plants corresponding to the inventory items onto racks for placements into a vehicle for subsequent delivery (e.g., via the rack sheet of FIG. 6).

The screenshot 800 may also include an export to logistics button 808 such that a subset of the information of the rack details per order display 804 may be transmitted to, for example, a logistics group responsible for planning delivery of orders to one or more customers. In this regard, manipulation of the export to logistics button 808 may trigger the transmission or export of one or more of the data rows of rack details per order display 804 to an external source and/or database (e.g., via data export module 192 as depicted in FIG. 1). In some embodiments, the transmission may involve storage of the selectively identified particular data rows in a database of storage 136. In yet other embodiments, the transmission may involve sending the selectively identified particular data rows to a logistics interface via the one or more data networks 120 (e.g., such as client device 124).

The selectively identified particular data rows may be identified based in part on a set of predetermined criteria. In one instance, the set of predetermined criteria may facilitate the identification of the order number column 816, the total rack count (e.g., according to rack number column 820), the rack type (e.g., according to the rack type column 844), and the region (e.g., according to customer information 160 associated with an order number of the order number column 816). It may be appreciated that other identified particular data columns may be envisioned, based on other predetermined criteria. The screenshot 800 may also include a print rack sheet button 812 operable to print, for example, a rack sheet (e.g., such as that depicted in FIG. 6) including the information of the rack details per order display 804 (e.g., at one or more other 140 devices of central server 116, and/or the output 220 device of user interface 124).

Figure 9:
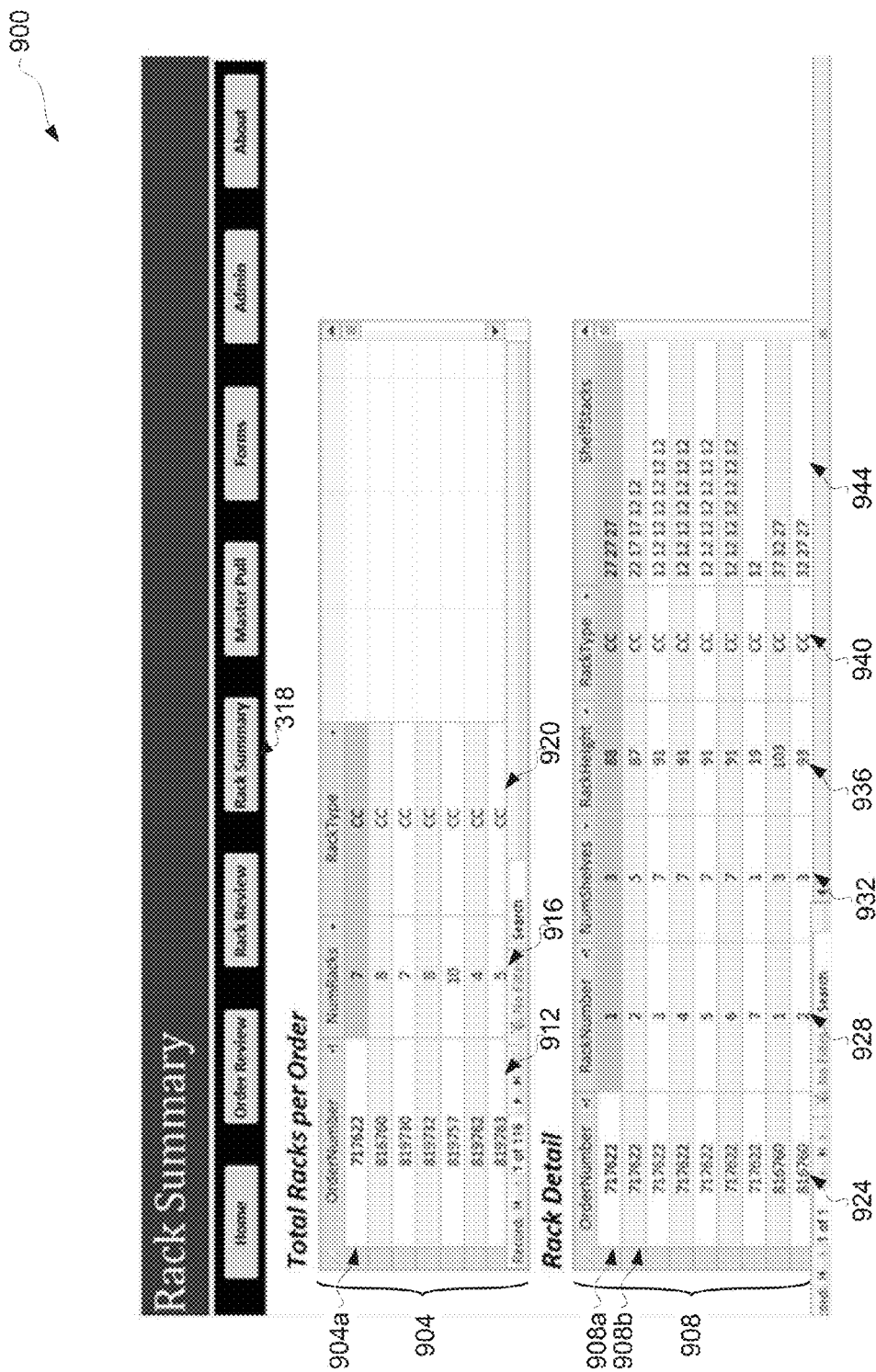

Turning next to FIG. 9, a screenshot 900 is depicted in which the rack summary button 318 has been manipulated such that the second level region 308 corresponds to information associated with the rack review button 318. In particular, the second level region 308 of screenshot 900 may include a total racks per order display 904 and a rack detail display 908. In this regard, the rack summary button 318 may facilitate the communication of information associated with particular details of each order (e.g., the number of racks per order) and of each rack (e.g., the number of shelves per rack) for the orders associated with, for example, the optimized rack generated in response to initiating optimize rack button 712.

In particular, total racks per order display 904 may include information pertaining to the total number and type of racks per order. In this regard, the total racks per order display 904 may include an order number column 912, a number of racks column 916, and a rack type column 920. Consider, for the sake of illustration, row 904a of total racks per order display 904, which illustrates an embodiment of the information included in the total racks per order display 904. For example, row 904a corresponds to order number 717622 per order number column 912. With further reference to the total racks per order display 904, row 904a indicates that the order number 717622 includes seven racks of the rack type CC, according to number racks column 916 and rack type column 920, respectively.

Additionally, the rack detail display 908 may include information pertaining to various details of each rack associated with a corresponding order (e.g., with each of the seven racks of order number 717622). In this regard, rack detail display 908 may include an order number column 924, a rack number column 928 (indicating a sequence number of the rack relative to the other racks of the order), a number of shelves column 932 (i.e., a number of shelves in the particular rack), a rack height column 936, a rack type column 940, and a shelf stack column 944 (indicating a height of each of the shelves of the rack). Consider, for the sake of illustration, row 908a of rack detail display 908, which illustrates information associated with rack 1 of order number 717622 in which the optimization module 168 has determined, based at least in part on the incoming data 102 (e.g., order object data 104, etc.), that rack 1 is to include three shelves, consist of a total height of 88 inches, and be of a rack type of CC, according to number shelves column 932, rack height column 936, and rack type column 940, respectively. Additionally, each shelf of rack 1 has a height of 27 inches, according to shelf stack column 944. In contrast, consider, for the sake of illustration, row 908b of rack detail display 908, which illustrates information associated with rack 2 of order number 717622, in which the optimization module 168 has determined, based at least in part on the incoming data 102, that rack 2 is to include five shelves, consist of a total height of 87 inches, and be of a rack type of CC, according to number shelves column 932, rack height column 936, and rack type column 940, respectively. The height of each shelve of rack 2 may be determined by reference to shelf stack column 944 such the five shelves of rack 2 have a height of 22 inches, 17 inches, 17 inches, 12 inches, and 12 inches, respectively. In this regard, rack detail display 908 demonstrates the various pertinent details of each rack associated with a respective order number.

Figure 5:
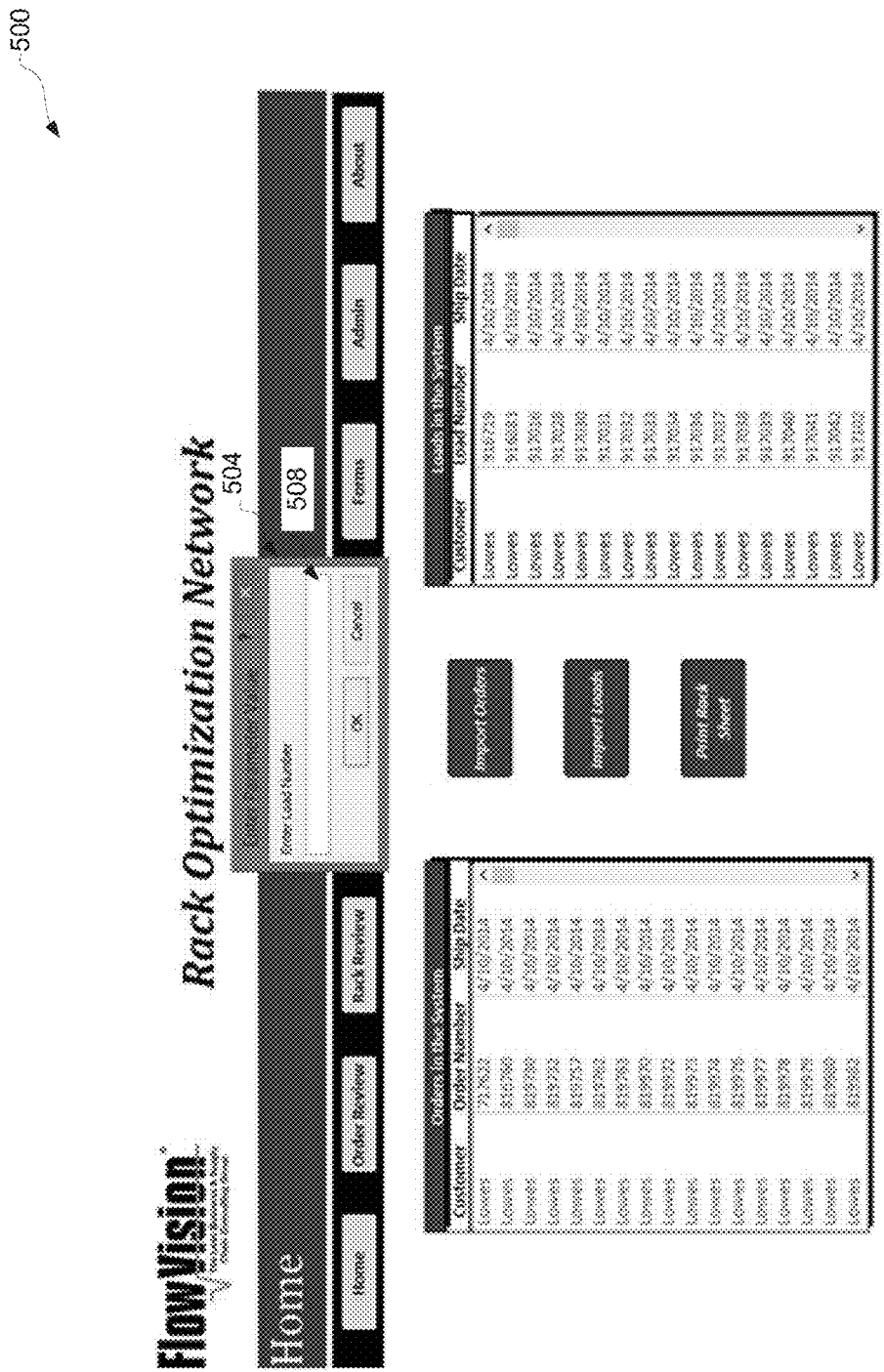

Turning next to FIG. 5, screenshot 500 is depicted in which the print rack sheet button 420 has been manipulated such that the enter parameter value window 504 may be displayed to a user. In this regard, the print rack sheet button 420 may be selected by a user in order to print a rack sheet report (e.g., made up of one or more rack sheets) based on a particular load. In some instances, each order object of the order object data 104 may be associated with one of the plurality of loads (e.g., such as that of load object data 108). Upon the selection of the print rack sheet button 420, the enter parameter value screen 500 may be displayed to the user. In particular, the enter parameter value window 504 may prompt a user to enter a load number at prompt 508. The user may therefore input a load number value from load number 408b of the loads in the system listing 408 in order for the system to generate the rack sheet report.

Figure 6:
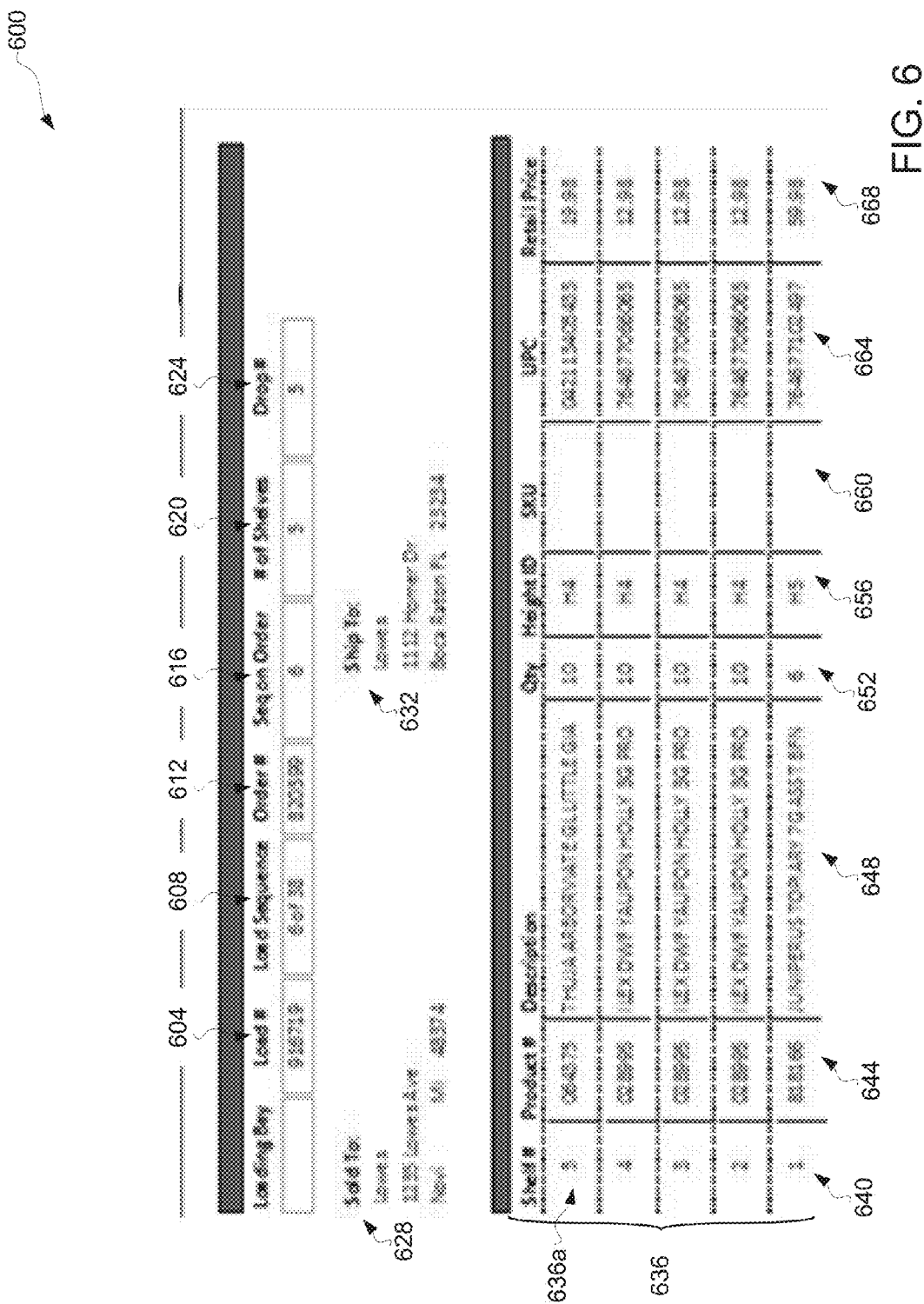

Turning now to FIG. 6, screenshot 600 is depicted indicative of a printed rack sheet report. The rack sheet report of screenshot 600 may include a plurality of informational attributes to facilitate the configuring of the rack space. In particular, this may include a load number 604, a load sequence 608, an order number 612, a sequence on order 616, a number of shelves 620, and a drop number 624. The informational attributes may facilitate the association of the rack sheet with a particular load number or order number, for instance. Notably, in this configuration, the rack sheet displays the number of shelves 620 such that the plurality of inventory items associated with the particular order is determined to require the number of shelves equal to the value of the informational attribute of the number of shelves 620. Moreover, screenshot 600 illustrates a billing field 628 and a shipping field 632. In this regard, the rack sheet is associated both with a customer billing address (e.g., billing field 628) and a customer shipping address (e.g., shipping field 632). Both the customer billing address and customer shipping address may, for example, be retrieved from customer information 160 stored at order database 152. Furthermore, screenshot 600 also includes detail inventory display 636 operable to display the inventory details associated with the rack sheet in a plurality of data columns. In this embodiment, the inventory display 636 includes a shelf number column 640, a product number column 644, a description column 648, a quantity column 652, a height ID column 656, an SKU column 660, a UPC column 664, and a retail price column 668.

Consider, for the sake of illustration, row 636a of inventory display 636, which displays various informational attributes associated with shelf number 5, according to shelf number column 640. In particular, row 636a includes information pertaining to the contents of shelf number 5 of the particular order and load number (e.g., load number 916719 and order number 820599, according to load number 604, and order number 612, respectively) of the rack sheet report of screenshot 600. As such, in the embodiment of screenshot 600, row 636a may include 10 instances of product number 064375, "THULA ARBORVIATE GLLITTLE GIA," according to quantity column 652, product number column 644, and description column 648, respectively.

Notably, each of the plurality of data columns displayed in detail inventory display 636 may be derived from one or more data sources. For example, the description column 648 may be populated with information retrieved from inventory database 172 (e.g., such as information entered via the import item master tool 342). Whereas other of the plurality of data columns may be directly associated with order object data 104 (e.g., quantity column 652, retail price column 668, etc.). As will be discussed in greater detail below, the detail inventory display 636 may generally comprise the informational attributes required for the optimization module 168 to configure the rack space based on, for example, a configuration parameter of a customization record.

Figure 10:
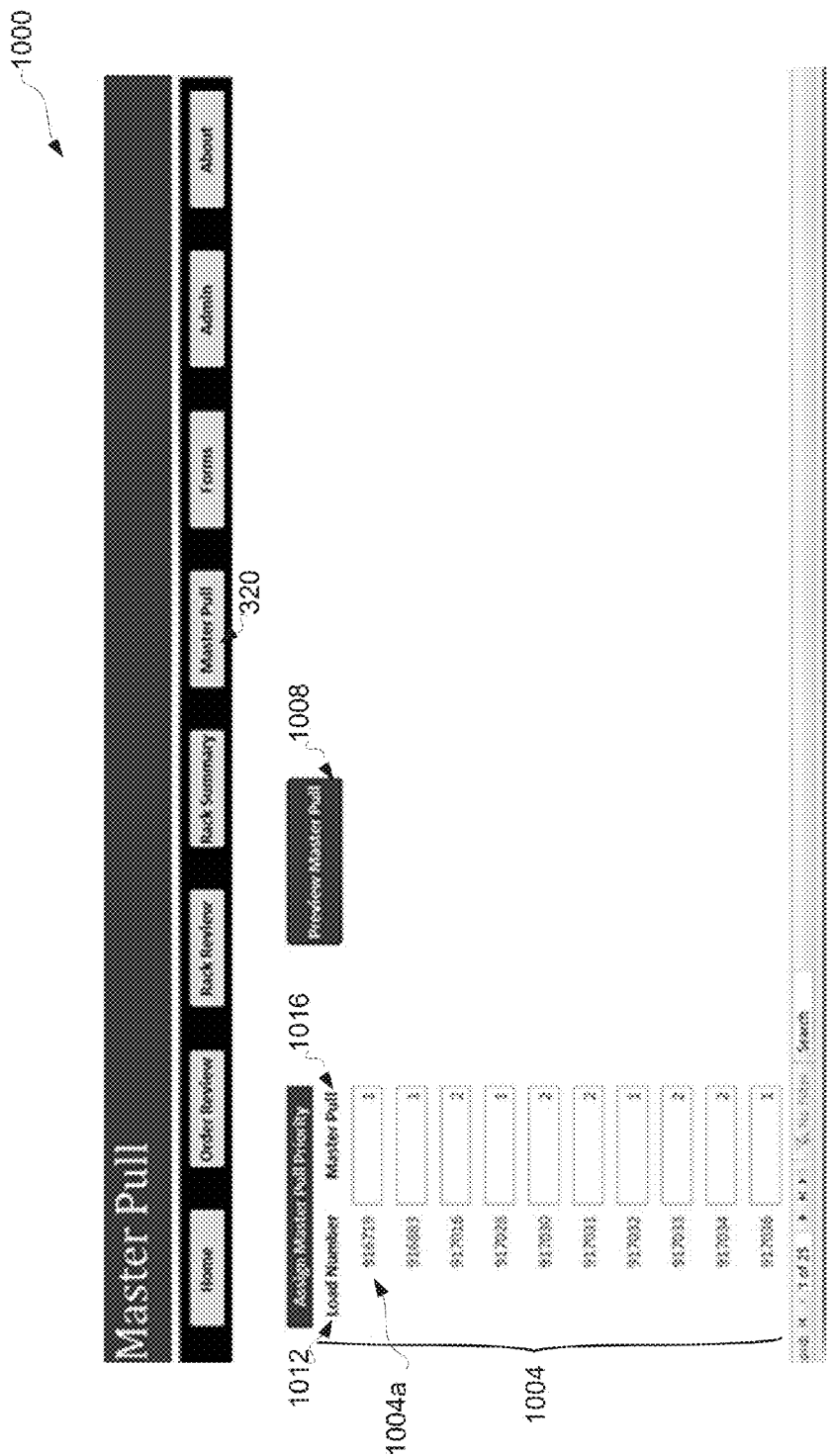

Turning next to FIG. 10, a screenshot 1000 is depicted in which the master pull button 320 has been manipulated such that the second level region 308 (not labeled in FIG. 10) corresponds to information associated with the master pull button 320. As discussed previously, users may export the optimized configured orders to a logistical team or the like, such as via manipulating button 808 of FIG. 8. The logistical team may appropriately group the orders into load objects and then import the load objects back into the central server 116, such as via manipulating button 416 of FIG. 4. The screenshot 1000 may allow users to group the loads objects (respectively associated with load numbers in FIG. 10) into master pull group objects as discussed below.

In particular, the second level region 308 of screenshot 1000 may include an assign master pull priority list 1004 and a preview master pull button 1008. As will be discussed, the various functionalities described with respect to screenshot 1000 may facilitate (e.g., via pull sheet generator 184 of FIG. 1) collecting quantities of inventory items corresponding to identified common instances of inventory items associated with the various loads. In particular, users may assign a priority number to each load number of the assign master pull priority list 1004, where all loads having a common priority number are part of the same master pull group (e.g., which may be determined, for example, by reference to master pull priority column 1016). Manipulation of the preview master pull button 1008 may then trigger the pull sheet generator 184 to identify and aggregate common instances of inventory items across all of the various loads in each particular master pull group. For instance, all of the inventory items of a particular master pull group may be harvested or otherwise collected from a growing operation at substantially the same time. As such, assign master pull priority list 1004 may include a load number column 1012 and a master pull priority field 1016. The load number column 1012 may include a plurality of loads. As discussed above, the master pull priority field 1016 may allow, for example, a user to associate a priority number (e.g., with the number one as the highest priority or of the most importance, the number two as the second highest priority or of the second-most importance, etc. according to one embodiment) with each of the load numbers of the load number column 1012.

For the sake of illustration, consider row 1004a of assign master pull priority list 1004, which illustrates load number 916917 associated with a priority number one, according to load number column 1012 and master pull priority field 1016, respectively. In one embodiment, master pull priority field 1016 may correspond to a prioritization based at least in part on the sequence in which the various loads may be loaded onto a vehicle, such as for delivery to an intended customer location (e.g., stored at customer information 160 of order database 152). By assigning a numeric priority number to the master pull priority field 1016, the central server 116 may facilitate configuring the inventory of the various loads based on loads with common priority numbers, for example (e.g., loads 916719, 916883, 917028, etc. may all belong to a master pull group #1). Manipulation of the preview master pull button 1008 may be operable to display a master pull report according to a value of master pull priority field 1016. As such, discussed in greater detail below, the central server 116 may group and display information pertaining to, for example, the location of inventory in a growing operation according to a predetermined priority associated with the load number.

Figure 11:
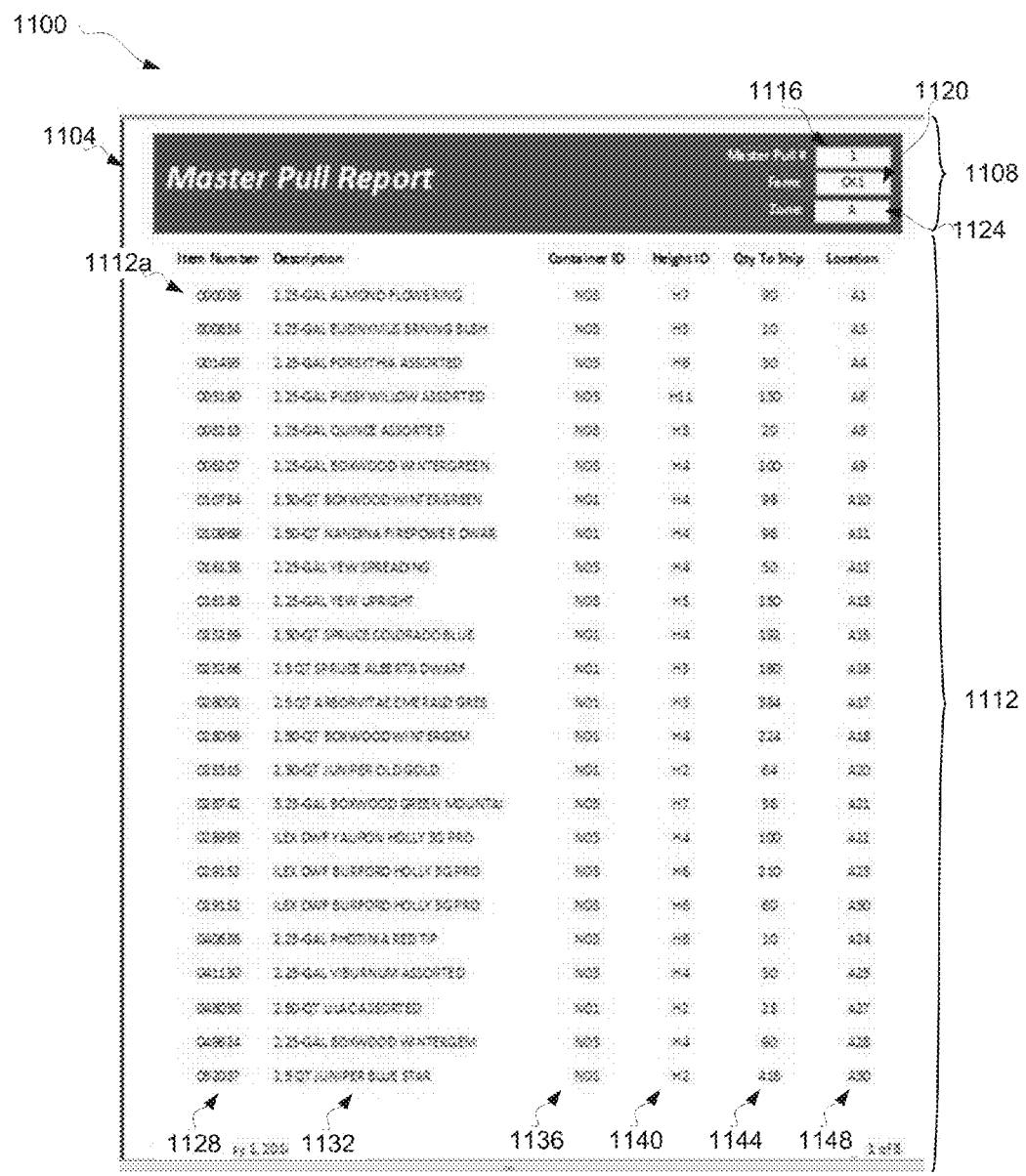

Turning next to FIG. 11, a screenshot 1100 is depicted in which a master pull report 1104 is displayed. In some embodiments, the master pull report 1104 may be displayed in response to a received indication associated with preview master pull button 1008. As such, the master pull report 1104 may display inventory information according to a common master pull priority number. In some instances, the master pull report 1004 may also display inventory information according to a common zone, for example, a zone associated with the physical location of the inventory item in the growing operation. In this regard, the master pull report 1104 may include header information 1108 and detail display information 1112. The header information 1108 may indicate the categorization upon which inventory information of the detail display information 1112 is presented. In this regard, header information 108 may include a master pull number field 1116, a farm field 1120, and a zone field 1124.

For the sake of illustration, consider the particular embodiment of the master pull number field 1116, the farm field 1120, and the zone field 1124 of master pull report 1104 of screenshot 1100. Accordingly, the master pull report 1104 is associated with displaying information pertaining to the various inventory items corresponding to a master pull priority number one, of farm OK1 and of zone A, according to master pull priority number field 1116, farm field 1120, and zone field 1124, respectively. In this regard, the header 1108, of this embodiment, may signify that each of the inventory items described in detail display 1112 may correspond to a load with a master pull priority number equal to 1 (e.g., all loads with a priority of 1 in FIG. 10) and that may be located in a growing operation according to the farm designation OK1 and the zone designation A.

Furthermore, detail display 1112 may include various data columns that provide information pertaining to each inventory item corresponding to the various designations of the master pull report header 1108 (e.g., master pull priority number field 1116, farm field 1120, zone field 1124, etc.). In this regard, detail display 1112 may include an item number column 1128, a description column 1132, a container ID column 1136, a height ID column 1140, a quantity to ship column 1144, and a location column 1148. Consider, for the sake of illustration, row 1112a of detail display 1112, which illustrates the various detail information of, for example, item number 000038, according to item number column 1128. In this regard, item number 000038 is associated with a description of "2.25-GAL ALMOND FLOWERING," a container ID N03, a height ID of H7, a quantity to ship of 90, and a location of A1, according to description column 1132, container ID column 1136, height ID column 1140, quantity to ship column 1144, and location column 1148, respectively.

Notably, the foregoing data attributes of item number 000038 may facilitate harvesting and/or collecting of a plurality of the particular inventory item from a growing operation for all of the loads of this master pull group and creating a "supermarket," discussed in greater detail below, with all of the collected inventory items for the loading of racks for the various load objects of this master pull group with corresponding rack sheets (e.g., such as that depicted in FIG. 6). For example, the quantity to ship column 1144 and location column 1148, may indicate the quantity of inventory to retrieve at a particular identified location (e.g., according to the embodiment of row 1112a, this may be location A1 of zone A of farm OK1, in which 90 such inventory items are to be retrieved). By way of further example, the container ID column 1136 and height ID column 1140 may facilitate loading the inventory items onto a vehicle for subsequent delivery by identifying a particular container for which the inventory item may be associated with for shipment of the inventory items.

Figure 12:
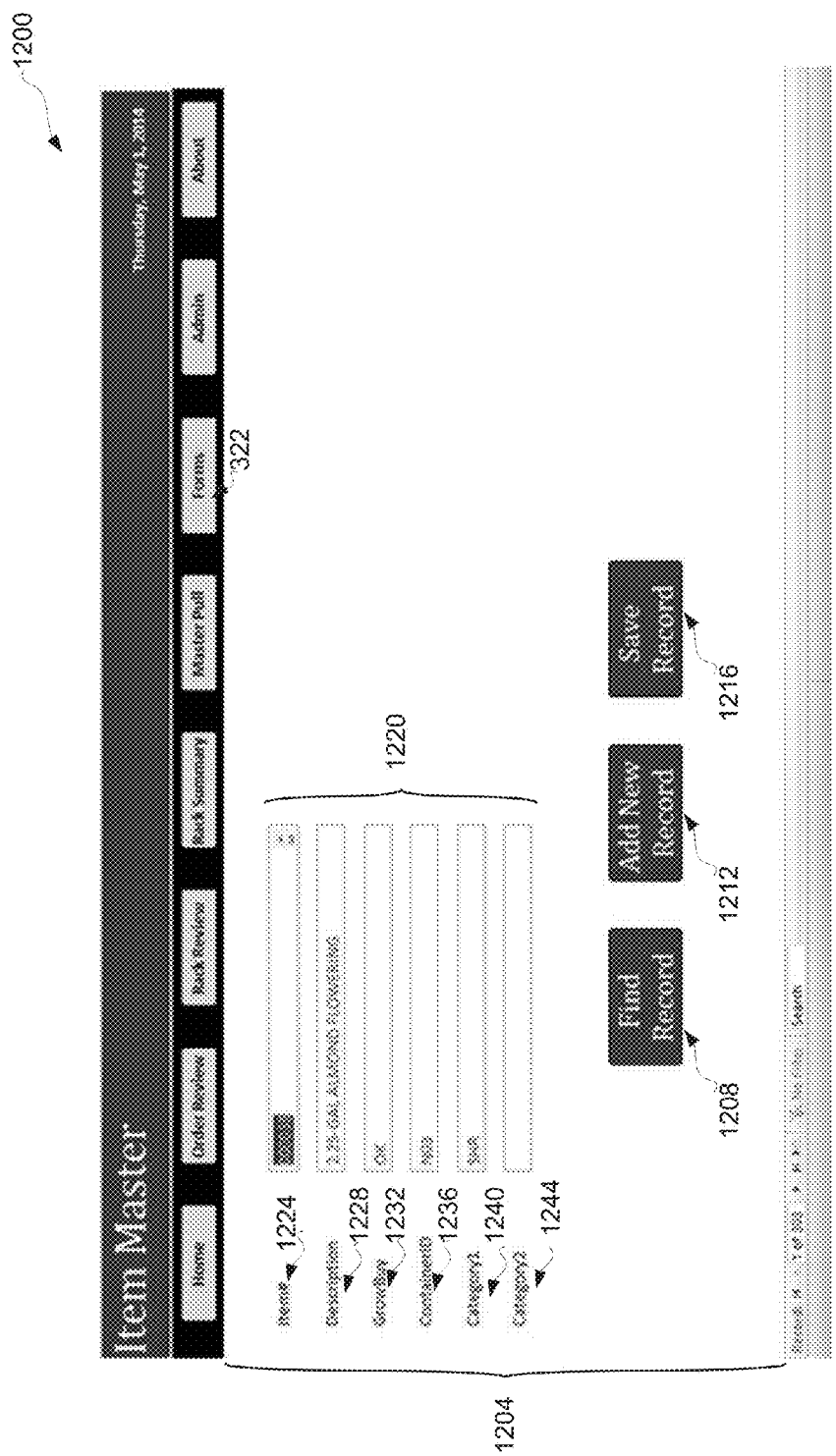

Turning next to FIG. 12, a screenshot 1200 is depicted in which the forms button 322 has been manipulated such that the second level region 308 corresponds to information associated with the forms review button 322. In particular, the second level region 308 of screenshot 1200, in this embodiment, corresponds to an item master database interface 1204, such that information associated with an inventory item may be manually updated. In particular, item master database interface 1204 may facilitate the creation or modification of a database record associated with an inventory item (e.g., a inventory item stored at inventory database 172 of storage 136). In this regard, the item master database interface 1204 may add or modify a database record that the central server 116 may access, in part, to facilitate configuration of the rack space and/or generate a master pull sheet.

The item master database interface 1204 may include one or more buttons for use in manipulating an inventory database record. For example, the item master database interface 1204 may include a find record button 1208, an add new record button 1212, and/or a save record button 1216. The find record button 1208 may be selected to facilitate the location of a particular inventory database record. The add new record button 1212 may be selected to facilitate the creation of a new inventory database record. The save record button 1216 may be selected to facilitate saving an inventory database record (e.g., after modification of an existing inventory database record).

The item master database interface 1204 may also include an item master display field 1220 operable to display one or more data fields of a particular inventory database record for viewing and/or modification. For example, the item master display field 1220 may include an item number field 1224, a description field 1228, a grow buy field 1232, a container ID field 1236, a category 1 field 1240, and a category 2 field 1244. For the sake of illustration, consider a hypothetical inventory item number 000038 as depicted according to the embodiment of screenshot 1200. According to this illustration, the item master display field 1220 includes various data fields associated with inventory item number 000038, according to inventory item number field 1224. By reference to the item master display field 1220, inventory item number 000038 includes a description of "2.25-GAL ALMOND FLOWERING," a grow by status of OK, a container ID status of N03, a category 1 status of SHR, according to the description field 1228, the grow buy field 1232, the container ID field 1236, and the category 1 field 1240, respectively.

Notably, each of the foregoing data fields of the item master display field 1220 may be modified. In some embodiments, the modification of the data field of the item master display field 1220 may modify an inventory database record associated with the inventory item number 1224, for example, such that the modified inventory database record may be accessed and/or used in any of the foregoing configured rack space and/or master pull sheet reports. For example, consider that the description of item number 000038 is "2.25-GAL ALMOND FLOWERING," according to the embodiment of a screenshot 1200. In this regard, the description "2.25-GAL ALMOND FLOWERING," may appear in any generated report in which item number 000038 is included (e.g., a rack sheet report, a master pull sheet, etc.). As such, to the extent that the description of item number 000038 may be modified within the item master display field 1220 (e.g., at description field 1228), subsequently generated reports in which item number 000038 is included may therefore include the provided modified description.

Figure 13:
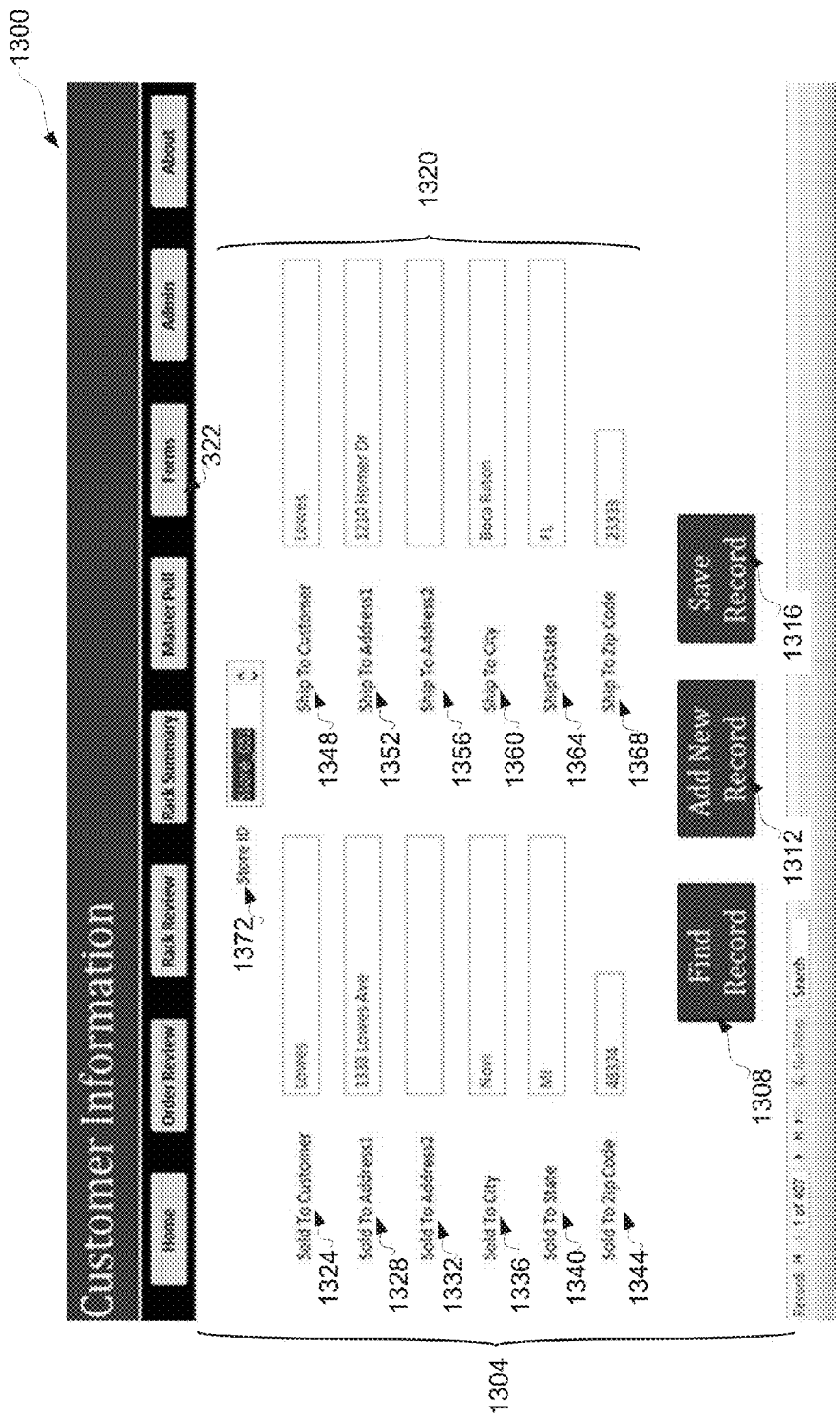

Turning next to FIG. 13, a screenshot 1300 is depicted in which the forms button 322, according to another embodiment, has been manipulated such that the second level region 308 corresponds to information associated with the forms review button 322. In particular, the second level region 308 of screenshot 1300, in this embodiment, corresponds to a customer information database interface 1304, such that information associated with customer information (e.g., such as that stored at customer information 160 of storage 136) may be manually updated. In particular, customer information database interface 1304 may facilitate the creation or modification of a database record associated with customer information. In this regard, the customer information database interface 1300 may add or modify a database record that the central server 116 may access, in part, to facilitate delivery of, for example, an order (e.g., by providing a shipping address to which the order may be delivered).

The customer information database interface 1304 may include one or more buttons for use in manipulating a customer information database record. For example, the customer information database interface 1304 may include a find record button 1308, an add new record button 1312, and a save record button 1316. The find record button 1308 may be selected to facilitate the location of a particular customer information database record. The add new record button 1312 may be selected to facilitate the creation of a new customer information database record. The save record button 1316 may be selected to facilitate saving a customer information database record (e.g., after modification of an existing customer information database record).

The customer information database interface 1304 may also include a customer information display field 1320 operable to display one or more data fields of a particular customer information database record for viewing and/or modification. For example, the customer information display field 1320 may include one or more data fields associated with customer information billing information. Accordingly, the one or more data fields associated with customer information billing information may include a sold to customer field 1324, a sold to address 1 field 1328, a sold to address 2 field 1332, a sold to city field 1336, a sold to state field 1340, and a sold to ZIP code field 1344. Additionally, the item master display field 1320 may also include one or more data fields associated with customer shipping information. Accordingly, the one or more data fields associated with customer shipping information may include a ship to customer field 1348, a ship to address 1 field 1352, a ship to address 2 field 1356, a ship to city field 1360, a ship to state field 1364, and a ship to ZIP code field 1368. Furthermore, the customer information database record of customer information display field 1320 may be associated with a particular store ID, such as that of store ID field 1372. In this regard, customer information database interface 1304 may facilitate modifying storing a customer information database record associated with both the billing address of a particular customer and/or the shipping address of a particular customer.

Notably, each of the foregoing data fields of the customer information display field 1320 may be modified. In some embodiments, the modification of the data field of the customer information display field 1320 may modify a customer information database record associated with a particular customer (or customer delivery location), such that the modified customer information database record may be accessed and/or used in any of the foregoing configured rack space and/or master pull sheet reports. For example, consider that, as depicted in the embodiment in screenshot 1300, Store_051 is associated with the street address of "1210 Homer Dr," according to ship to address 1 field 1352. In this regard, the street address "1210 Homer Dr" may appear in any generated report in which Store_051 is included (e.g., a rack sheet report, a master pull sheet, etc.). As such, to the extent that the street address of Store_051 is modified within the customer information display field 1320 (e.g., at ship to address 1 field 1352), subsequently generated reports in which item store ID store_051 is included may therefore include the provided modified street address.

Figure 14:
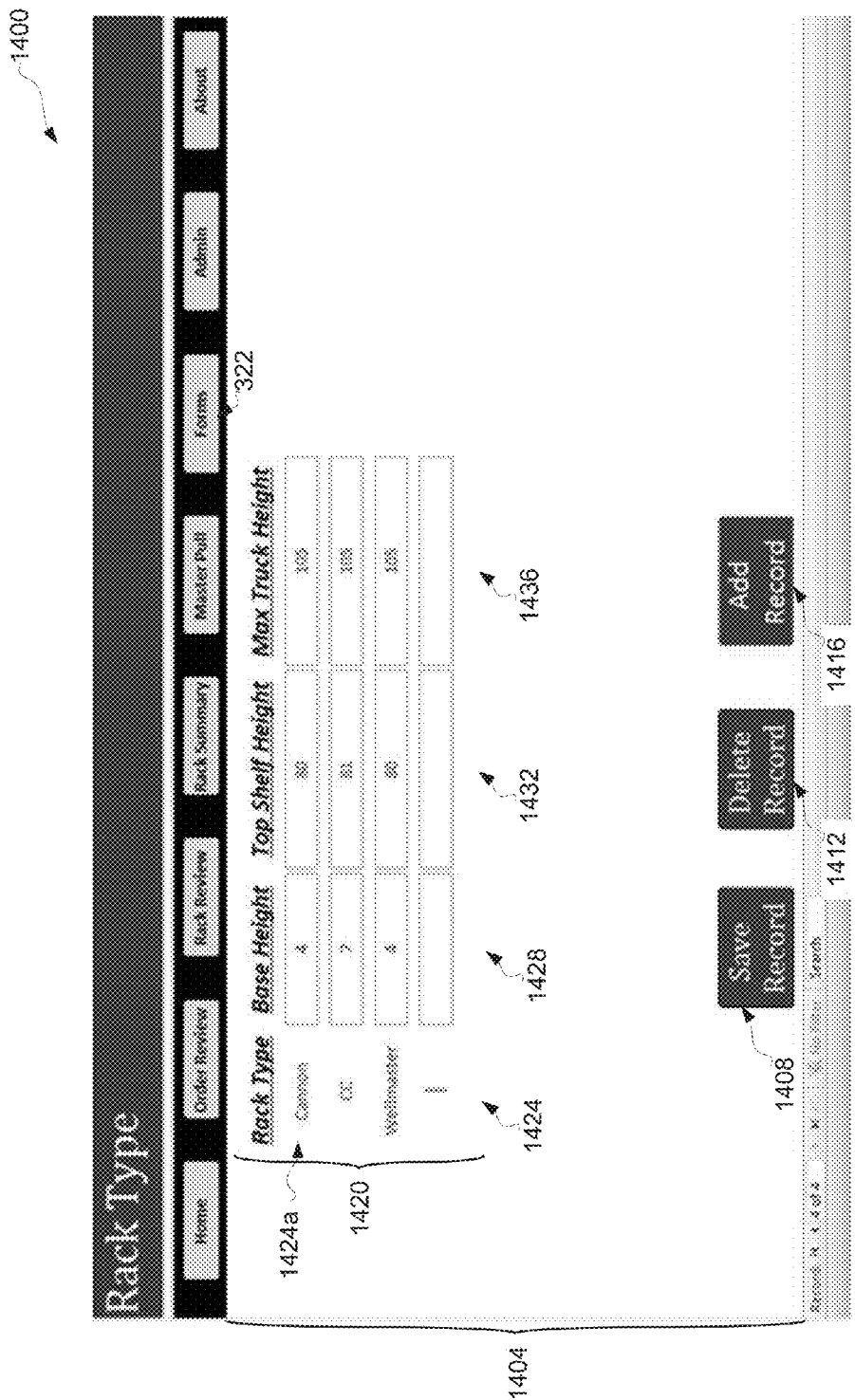

Turning next to FIG. 14, a screenshot 1400 is depicted in which the forms button 322, according to another embodiment, has been manipulated such that the second level region 308 corresponds to information associated with the forms review button 322. In particular, the second level region 308 of screenshot 1400, in this embodiment, corresponds to a rack type database interface 1404, such that information associated with a rack type may be manually updated. In particular, the rack type database interface 1404 may facilitate the creation or modification of a database record associated with a rack type. In this regard, the rack type database interface 1404 may add or modify a database record that the central server 116 may access, in part, to facilitate rack configuration (e.g., by providing physical properties associated with the rack which may be used to configure the rack).

The rack type database interface 1404 may include one or more buttons for use in manipulating a rack type database record. For example, the rack type database interface 1404 may include a save record button 1408, a delete record button 1412, and an add record button 1416. The save record button 1408 may be selected to facilitate saving a rack type database record (e.g., after modification of an existing rack type database record). The delete record button 1412 may be selected to facilitate deletion of an existing rack type database record. The add record button 1416 may be selected to facilitate the creation of a new rack type database record.

The customer information database interface 1420 may also include a rack type display field 1420 operable to display one or more data columns associated with a rack type database record for viewing and/or modification. For example, the rack type display field 1420 may include a rack type column 1424, a base height column 1428, a top shelf height column 1432, and a maximum truck height column 1436. In this regard, the one or more data columns associated with the rack type database record may include information corresponding to physical characteristics of a particular rack type such that the central server 116 may configure inventory items of the particular rack based on the noted physical characteristics. Consider, for the sake of illustration, row 1420a, which illustrates various physical properties associated with a Canon rack type, according to rack type column 1424. In this regard, the Canon rack type is associated with a base height of 4, a top shelf height of 80, and a maximum truck height of 105, according to base height column 1428, top shelf height column 1432, and maximum truck height column 1436, respectively (in inches, according to one embodiment). In this regard, row 1420a, according to this embodiment, includes the various physical properties that may be required to configure the rack space (e.g., by defining a pre-determined geometry of each rack upon which the various inventory items may be disposed).

Notably, each of the foregoing data fields of the rack type display field 1420 may be modified. In some embodiments, the modification of the data field of the rack type display field 1420 may modify a rack type database record associated with a particular rack, such that the modified rack type database record may be accessed and/or used in any of the foregoing configured rack space and/or master pull sheet reports. For example, consider that, as depicted in the embodiment in screenshot 1400, rack type "Cannon" is associated with a top shelf height of 80, according to top shelf height column 1432. In this regard, the top shelf height of 80 may appear in any generated report in which the Cannon rack type is included (e.g., a rack sheet report, a master pull sheet, etc.). As such, to the extent that the top shelf height of the Cannon rack type may be modified within the rack type display field 1420 (e.g., at top shelf height column 1432), subsequently generated reports in which a cannon rack type is included may therefore include the provided modified top shelf height.

Turning next to FIG. 15, a screenshot 1500 is depicted in which the forms button 322, according to another embodiment, has been manipulated such that the second level region 308 corresponds to information associated with the forms button 322. In particular, the second level region 308 of screenshot 1500, in this embodiment, corresponds to a height ID database interface 1504, such that information associated with a height ID may be manually updated. In particular, the height ID database interface 1504 may facilitate the modification of a database record associated with a height ID. In this regard, the height ID database interface 1404 may modify a database record that the central server 116 may access, in part, to facilitate rack configuration (e.g., by associating an inventory item with a height ID, configuring a rack based on a selected portion of a height ID range, etc.).

In this regard, height ID database interface 1504 may include one or more data columns that correspond to a height ID database record. For example, the height ID database interface 1504 may include a height ID column 1508, a minimum height column 1512, a median height column 1516, and a maximum height column 1520. Consider, for the sake of illustration, row 1504a, which includes various informational attributes associated with the height ID H2, according to the height ID column 1508. According to this embodiment of screenshot 1500, the height ID H2 is associated with a minimum height of 5, a median height of 7, and a maximum height of 9, according to the minimum height column 1512, the median height column 1516, and the maximum height column 1520, respectively. Accordingly, the various data attributes associated with the height ID of H2 correspond to a range of heights, which may be associated with an inventory item. As such, the minimum height column 1512 may correspond to the anticipated minimum height of an inventory item, the median height column 1516 may correspond to the anticipated medium height of an inventory item, and the maximum height column 1520 may correspond to the anticipated maximum height of an inventory item. With brief reference to FIG. 3, each of the foregoing volumes of the height ID may be used by the height range calculation utility 334 to configure the rack on the basis of a height range preference (e.g., calculating based on the lowest end of the range such as for use early in the season, the median of the range, or the highest end of range such as for use late in the season or for plants known to greatly vary in height).

Notably, each of the foregoing data fields of the height ID database interface 1504 may be modified. In some embodiments, the modification of the data field of the height ID database interface 1504 may modify a height ID database record associated with a particular height ID, such that the modified height ID database record may be accessed and/or used in any of the foregoing configured rack space and/or master pull sheet reports. For example, consider that, as depicted in the embodiment in screenshot 1500, the height ID H2 is associated with a minimum height of 5, according to minimum height column 1512. In this regard, the minimum height of 5 may be associated with any generated report in which the height ID of H2 is included (e.g., a rack sheet report, a master pull sheet, etc.). As such, to the extent that the minimum height of the H2 height ID may be modified within the height ID database interface 1504 (e.g., at minimum height column 1512), subsequently generated reports in which an H2 height ID is included may therefore include the provided modified minimum height ID.

Figure 16:
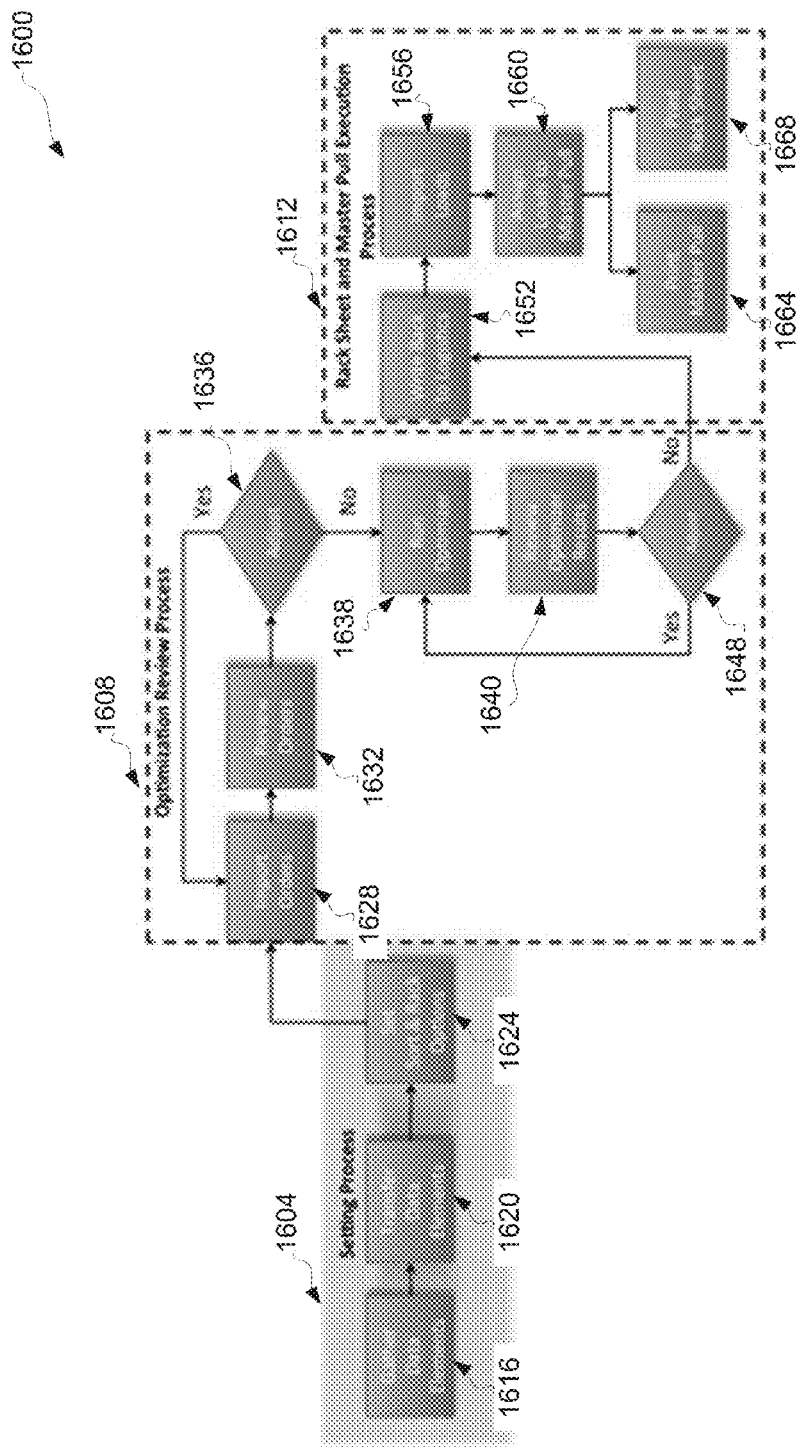
FIG. 16 illustrates a flow diagram of an embodiment of a method for configuring rack space utilization in a growing operation.
Figure 17:
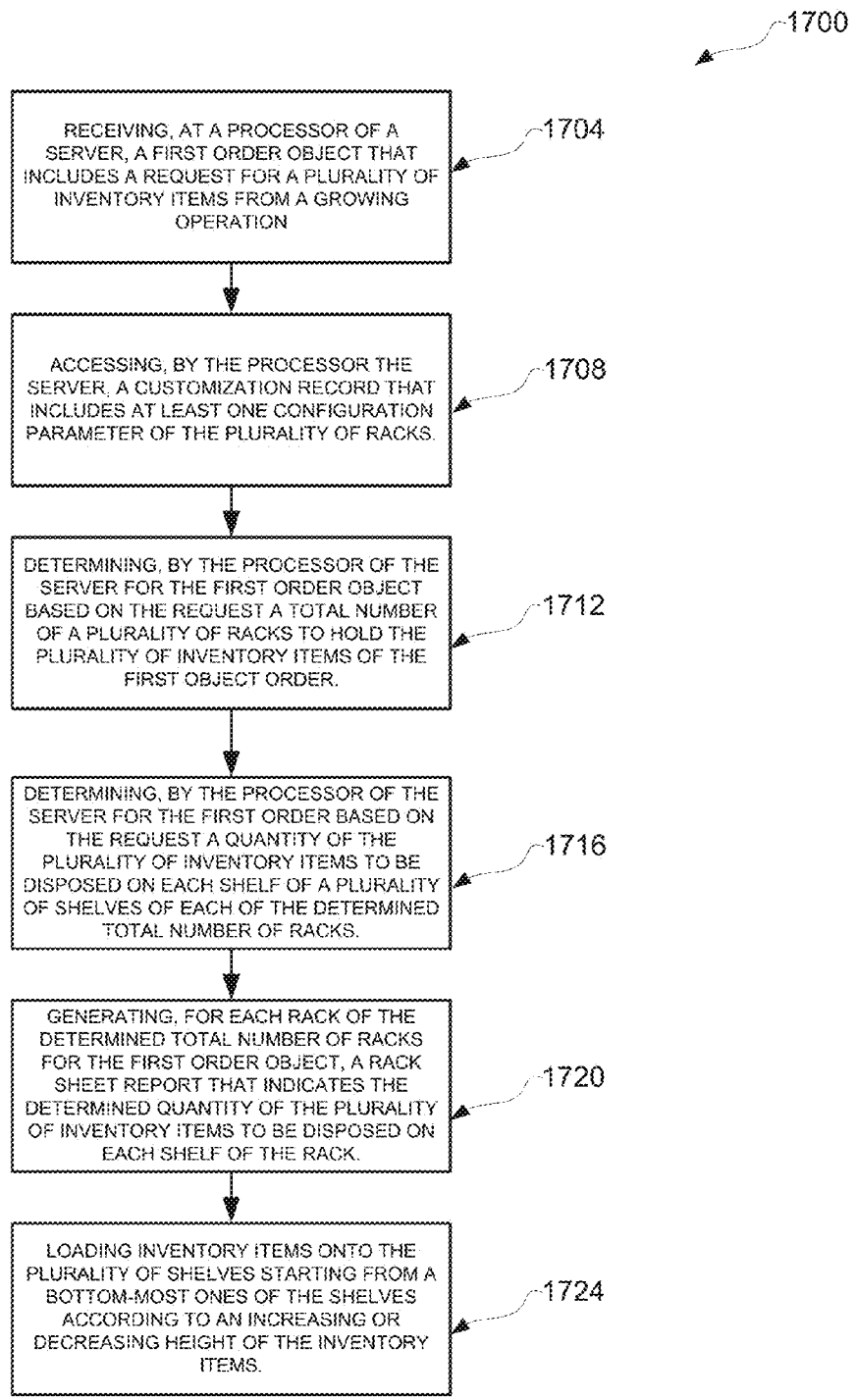
FIG. 17 illustrates a flow diagram of another embodiment of a method for configuring rack space utilization in a growing operation.
Figure 18:
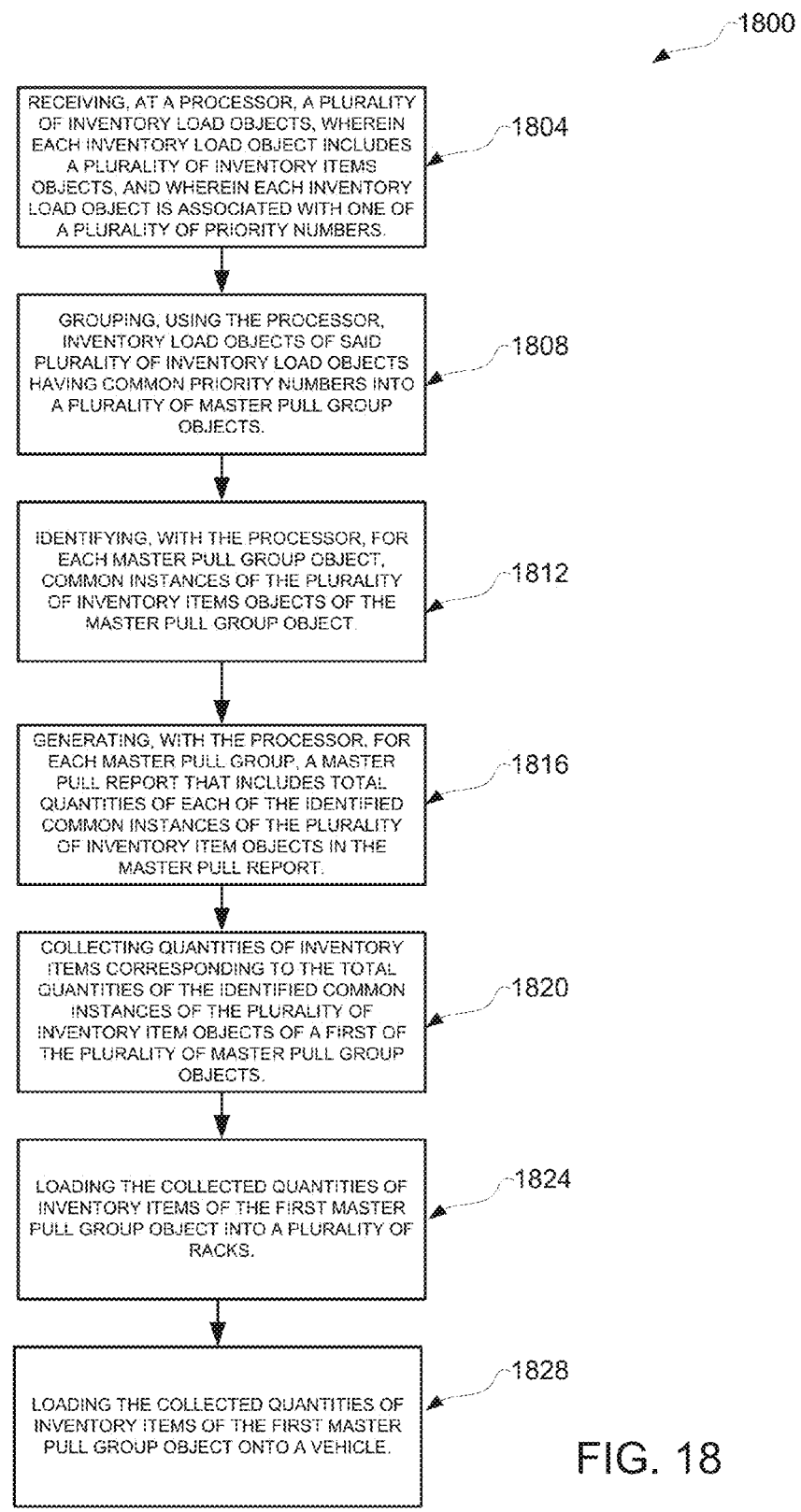
FIG. 18 illustrates a flow diagram of an embodiment of a method of managing inventory workflow in a growing operation.

To further facilitate the reader's understanding of the various functionalities of the utilities disclosed herein, reference is now made to flow diagrams in FIGS. 16, 17, and 18, which respectively illustrate method 1600, 1700, and 1800 for use in configuring rack space utilization in a growing operation. While specific steps (and orders of steps) of methods 1600, 1700, and 1800 have been illustrated and will be discussed, other methods (including more, fewer, or different steps than those illustrated) consistent with the teaching presented herein are also envisioned and encompassed with the present disclosure.

With initial reference to FIG. 16, method 1600 relates generally to generating a rack sheet and master pull sheet based, in part, on various predetermined parameters and a configured rack space result. In this regard, method 1600 presents various discrete overarching process steps which may facilitate generating the rack sheet and the master pull sheet. As such, method 1600 may include a setting process 1604, an optimization review process 1608, and a rack sheet and master pull execution process 1612. The setting process 1604 may facilitate programming predetermined criteria and/or attributes required for the rack space configuration (e.g., establishing an inventory item database record, a customer information database record, a rack type database record, etc.), as well as determining configuration parameters (e.g., such as a height range preference). The optimization review process 1608 may facilitate configuring the rack space utilization based on received order and predetermined variables established during the setting process 1604, as discussed in greater detail below. The rack sheet and master pull execution process 1612 may facilitate generating a rack sheet and/or a master pull sheet based, in part, on the configured rack space determined during the optimization review process 1608.

In this regard, according to one embodiment, the setting process 1604 may include gathering 1616 data elements (e.g., identifying predetermined criteria), transferring 1620 data elements into the central server 116 (e.g., automatically or manually), and setting 1624 sort and rack options (e.g., programming one or more customization parameters). For the sake of illustration, consider an embodiment where the setting process 1604 facilitates establishing the height ID database record and the associated customization preference. For example, a hypothetical height ID of H7 may be identified as required for the subsequent rack space configuration (e.g., because an inventory item of a particular order object may include a height represented by the height range associated with the height ID of H7). The height ID of H7 may be transferred to, for example, the central server 116 via an automatic or manual process (e.g., via the import height ID tool 354). Moreover, the height ID may be utilized to set a customization preference associated with the height ID (e.g., such as the height range calculation utility 334).

In another embodiment, the optimization and review process 1608 may include importing 1628 orders, reviewing 1632 orders, and possibly adjusting 1636 the reviewed and imported orders. For instance, the central server 116 may receive a first order object (e.g., at data collection module 148) for use in configuring (e.g., optimizing) the rack space for the first order object. For example, the central server 116 may facilitate the review of the imported order such that the imported orders may be subsequently adjusted as needed (e.g., to add or subtract from the imported orders intended for rack space configuration). The optimization review process 1608 may also include a running 1638 optimization step, a review 1640 optimization results step, and an adjust 1648 optimization results query. In this regard, as discussed in greater detail below, the optimization review process 1608 may be operable to optimize the imported orders (e.g., determining how to more effectively configure or position inventory items of the imported orders on one or more racks). The central server 116, for example, via one or more displays, may facilitate the review of the optimized results by a user such that the optimize results may be adjusted (e.g., according to a modifiable customization parameters, which may yield a different optimized result).

In another embodiment, the rack sheet and master pull execution process 1612 may include a write 1652 back to logistics step (e.g., via manipulation of export to logistics button 808 as depicted in FIG. 8), an import loads step 1656 (e.g., via manipulation of import loads button 416 as depicted in FIG. 4), an assign 1660 loads to master pull step (e.g., via manipulation of the assign master pull priority list as depicted in FIG. 10), a print 1664 master pull step (e.g., via manipulation of the preview master pull button 1008 as depicted in FIG. 10), and a print 1668 rack sheet step (e.g., via manipulation of the prink rack sheet button 812 as depicted in FIG. 8). In this regard, the central server 116 may be operable to transmit data associated with the configured rack of the optimization review process 1608 to a data storage device for use in performing a logistics function (e.g., such as that described, with reference to FIG. 8, with respect to the export to logistics button 808 of screenshot 800). Additionally, the central server 116 may be operable to import loads (e.g., such as load object data 108 received at data collection module 148) and assign the loads to a master pull group (e.g., based in part on a common priority number). Notably, the rack sheet and master pull execution process 1612 may be operable to print both the master pull sheet and the rack sheet. In some embodiments, printing the master pull sheet and the rack sheet may correspond to transmitting either the master pull sheet and/or the rack sheet to a client device 124 via one or more external data networks 120.

Turning next to FIG. 17, method 1700 relates generally to configuring rack space utilization in a growing operation. In this regard, method 1700 may include receiving 1704 a first order object (e.g., such as order object data 104) that includes a request for a plurality of inventory items from the growing operation. The method 1700 may continue by accessing 1708 a customization record that includes at least one configuration parameter (e.g., such as that associated with the height range calculation utility 334). The method 1700 may continue by determining 1712, for the first order object based on the request the plurality of inventory items, a plurality of racks to hold the plurality of inventory items of the first object order (e.g., by reference to the quantity corresponding to the plurality of inventory items and accessed physical parameters of a selected rack). The method 1700 may continue by further determining 1716, for the first order object based on the requested plurality of inventory items, a quantity of the plurality of inventory items to be disposed on each shelf of a plurality of shelves of each of the determined total number of racks. The method 1700 may continue by generating 1720, for each rack of the determined total number of racks for the first order object, the rack sheet report that indicates the determined quantity of the plurality of inventory items to be disposed on each shelf of the rack.

According to some embodiments, the rack space may be configured based on a variety of predetermined criteria included in a customization record stored at storage 136. For example, the customization record may include a configuration parameter corresponding to one or more dimensions of the racks. As another example, the customization record may include at least one physical characteristic corresponding to at least one of the plurality of inventory items of the first order object, such as a inventory item height. In this regard, with return reference to step 1716, the central server 116 may determine a total number of shelves for each of the total number of racks based on the physical characteristic (e.g., height) of the plurality of inventory items. As another example, the customization record may also include a height range corresponding to at least one of the plurality of inventory items of the first order object. The height range may correspond to numerical values indicating the lowest end of the height range, the median portion of the height range, or a highest end of the height range for use in configuring the rack space (e.g., such as that of height range calculation utility 334).

According to another embodiment, the method 1700 may include loading 1724 the plurality of inventory items onto the plurality of shelves starting from a bottom most one of the shelves according to an increasing or decreasing height of the inventory items. In some instances, step 1724 may be accomplished by reference to a first fit decreasing algorithm, which may be operable to sort and load each of the plurality of inventory items based upon identifying a first available space large enough to hold the inventory item. Moreover, the central server 116 may then allocate that identified space to that particular inventory item.

According to another embodiment, the request for the plurality of inventory items may include a plurality of requests for a plurality of different inventory items. As such, the determined quantities of the plurality of different types of inventory items to be disposed on each of the plurality of shelves may be based on a preference to reduce the total number of the plurality of racks needed to house the plurality of inventory items. According to another example, the determined quantities of the at least one of the plurality of different types of inventory items to be disposed on each of the plurality of shelves may be based on a predetermined preference to group common ones of the plurality of different types of inventory items together on common ones of the plurality of shelves.

Turning next to FIG. 18, method 1800 relates generally to managing inventory workflow in a growing operation. In this regard, method 1800 may include receiving 1804 a plurality of inventory load objects (e.g., such as load object data 108). The received inventory load object may include a plurality of inventory item objects. As such, in some instances, the inventory load object may correspond to a group of orders intended for inclusion on the same vehicle. Notably, each inventory item of the inventory load object may be associated with one of a plurality of priority numbers. The method 1800 may continue by grouping 1808 the inventory item objects of the plurality of inventory load objects having common priority numbers into a plurality of master pull group objects (e.g., via a master pull report as depicted in screenshot 1100). The method 1800 may continue by identifying 1812, for each master pull group object, common instances of the plurality of inventory item objects of the master pull group object. The method 1800 may continue by generating 1816, for each master pull group a master pull report that includes total quantities of each of the identified common instances of the plurality of inventory item objects in the master pull group object.

The method 1800 may continue by collecting 1820 quantities of inventory items corresponding to the total quantities of the identified common instances of the plurality of inventory item objects of a first of the plurality of master pull group objects. In some instances, the quantities of inventory items of each master pull group may be collected and disposed at a common location (e.g., near a vehicle shipping dock or the like) to create a "supermarket" with all of the collected inventory items for the loading of racks for the various load objects of the master pull group with a corresponding rack sheet. According to some embodiments, the method 1800 may continue by loading 1824 the collected quantities of inventory items of the first master pull group object into a plurality of racks. The method 1800 may continue by loading 1820 the collected quantities of inventory items of the first master pull group object onto a vehicle. In this regard, the rack sheet report may facilitate the loading of the plurality of racks onto a vehicle by indicating a load sequence parameter. The load sequence parameter may be indicative of a sequence in which the collected quantities of inventory items are loaded onto the vehicle. In some instances, a load priority number, discussed in greater detail below, may be at least partially based on the load sequence parameter. According to one embodiment, the ground or floor of the common location (i.e., supermarket) designated for collected inventory disposition may be superimposed with a grid to facilitate the loading of racks onto a vehicle. For example, each cell of the grid may be associated with a number corresponding to a load sequence parameter. A rack associated with a load sequence parameter may be disposed at a cell associated with a corresponding load sequence parameter. In this regard, the collected quantities of inventory items may be loaded onto a vehicle efficiently at least partially based on the disposition of the rack within the cell of the superimposed grid.

In another embodiment, the central server 116 may collect quantities of inventory items corresponding to the total quantities of the identified common instances of the plurality of inventory item objects of a second of the plurality of master pull group objects. As such, the first master pull group may be associated with a first of the plurality of priority numbers and the second master pull group may be associated with a second of the plurality of priority numbers. In some instances, the first priority number may be greater than the second priority number. In this regard the collected quantities of inventory items may be loaded according to the different priority numbers. That is, in this embodiment, the first master pull group object with a greater priority number (i.e., indicating a greater importance), may be loaded onto the vehicle after loading the collected quantities of inventory items of the second master pull group object, of the lesser priority number. In some instances, the first priority number and the second priority number may be at least partially based on the load sequence parameter such that the collected quantities of inventory items may be loaded according to its disposition at a cell of a superimposed grid of a common collection location.

Notably, the steps of method 1800 may be performed in conjunction with the steps of 1700 in any appropriate order. That is, in some instances, the central server 116 may be operable to both generate a rack sheet (based on received orders) and generate a master pull group (based on received loads associated with a priority number). Moreover, it is not necessary that every one of the steps presented in method 1700 and 1800 be completed to effectuate configuring rack space utilization and/or generating a rack sheet and/or master pull sheet. For instance, the rack space may be configured without necessarily loading the quantities of inventory items onto a vehicle (i.e., without necessarily performing step 1828 of method 1800 of FIG. 18).

Embodiments disclosed herein can be implemented as one or more computer program products, i.e., one or more modules of computer program instructions encoded on a computer-readable medium for execution by, or to control the operation of, data processing apparatus. For example, the logic or software of database builder 156, data collection module 148, pull sheet generator 184, rack sheet generator 180, optimization module 168, and portal 188 responsible for the various functionalities disclosed herein may be provided in such computer-readable medium of the central server 116 and executed by the processing engine 132 as appropriate. The computer-readable medium can be a machine-readable storage device, a machine-readable storage substrate, a non-volatile memory device, a composition of matter affecting a machine-readable propagated signal, or a combination of one or more of them. In this regard, central server 116 may encompass one or more apparatuses, devices, and machines for processing data, including, by way of example, a programmable processor, a computer or multiple processor or computers. In addition to hardware, the central server 116 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide the functionality described herein may be written in any form of programming language, including compiled or interpreted languages, and may be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by an information flow network.

The block diagrams, processes, protocols and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

In some embodiments, the central server 116 may comprise one or more of various types of devices, including, but not limited to a personal computer system, desktop computer, laptop, notebook, netbook computer, mainframe computer system, handheld computer, workstation, network computer, application server, storage device, a consumer electronics device, a peripheral device such as a switch, modem, router, or, in general, any type of computing or electronic device.

The foregoing description of the present invention has been presented for purposes of illustration and description. Furthermore, the description is not intended to limit the invention to the form disclosed herein. Consequently, variation and modifications commensurate with the above teachings, skill and knowledge of the relevant art, are within the scope of the present invention. For instance, in some embodiments, configuring a rack may be applicable in other contexts, such as parcel delivery, bulk shipping containers, storage units, and the like. The embodiments described hereinabove are further intended to explain best modes known of practicing the invention and to enable others skilled in the art to utilize the invention in such, or other embodiments and with various modification required by the particular application(s) or use(s) of the present invention. It is intended that the appended claims be construed to include alternative embodiments to the extent permitted by the prior art.

What is claimed:

1. A method for configuring rack space utilization in a growing operation, the method comprising:
  receiving, at a processor of a server, a first order object that includes a request for a plurality of inventory items from the growing operation, each inventory item being a living object;
  accessing, by the processor, a customization record that includes a height identifier for each of the plurality of inventory items, wherein each height identifier corresponds to a different respective height range;
  receiving, by the processor, an indication of a portion of the height range for each inventory item and its respective corresponding height identifier, wherein the indication corresponds with an assumed height of the inventory item;

determining, by the processor of the server for the first order object based on a) the request, b) the customization record, and c) the indication:
   a total number of a plurality of racks to hold the plurality of inventory items of the first order object,
   a total number of shelves for each rack of the plurality of racks; and
   a quantity of the plurality of inventory items to be disposed on each shelf of the determined total number of shelves of each of the determined total number of racks; and
generating, for each rack of the determined total number of racks for the first order object, a rack sheet report that indicates the determined quantity of the plurality of inventory items to be disposed on each shelf of the determined total number of shelves of the rack.

2. The method of claim 1, further including:
first determining, by the processor, for a first type of inventory item of the plurality of inventory items, a total number of shelves to store the first type of inventory item; and
second determining, by the processor, for a second type of inventory item of the plurality of inventory items, a total number of shelves to store the second type of inventory item, wherein the total number of shelves to store the first type of inventory item and the total number of shelves to store the second type of inventory item contribute to the total number of shelves for each rack of the plurality of racks, and wherein one of:
   the first type of inventory item is the tallest of the plurality of inventory items and the second type of inventory item is the second tallest of the plurality of inventory items; or
   the first type of inventory item is the shortest of the plurality of inventory items and the second type of inventory item is the second shortest of the plurality of inventory items.

3. The method of claim 1, wherein the customization record includes one or more dimensions of the racks.

4. The method of claim 1, further including:
first determining, by the processor, for a first type of inventory item of the plurality of inventory items, that the first type of inventory item can be stored on a first portion of a first shelf; and
second determining, by the processor, for a second type of inventory item of the plurality of inventory items, whether an entirety of the second type of inventory item can be stored on a remaining portion of the first shelf, wherein the generated rack sheet report includes a result of the second determining shelf.

5. The method of claim 4, wherein one of:
the second determining includes ascertaining that an entirety of the second type of inventory item can be stored on the remaining portion of the first shelf and the generated rack sheet report assigns the first and second types of inventory items to the first shelf; or
the second determining includes ascertaining that an entirety of the second type of inventory item cannot be stored on the remaining portion of the first shelf and the generated rack sheet report assigns the first type of inventory item to the first shelf and the second type of inventory item to a second shelf.

6. The method of claim 1, wherein the portion of the height range for each height identifier is one of a plurality of portions of the height range.

7. The method of claim 6, wherein the plurality of portions of the height range for each height identifier include a lowest end, a median, and a highest end of the height range.

8. The method of claim 1, wherein the customization record includes a rack sort order preference attribute that indicates an order in which the plurality of inventory items are to be loaded onto the plurality of shelves of the plurality of racks.

9. The method of claim 8, wherein the rack sort order preference attribute is one of:
   loading inventory items onto the plurality of shelves starting from a bottom-most one of the shelves according to an increasing or decreasing height of the inventory items; or
   grouping common ones of the plurality of inventory items on the plurality of shelves.

10. The method of claim 1, wherein the request for the plurality of inventory items includes a plurality of requests for a plurality of different types of inventory items, and wherein the determining step includes:
   determining a quantity of at least one of the plurality of different types of inventory items to be disposed on each of the plurality of shelves.

11. The method of claim 10, wherein the determined quantities of the at least one of the plurality of different types of inventory items to be disposed on each of the plurality of shelves are based on a preference to reduce the total number of the plurality of racks needed to hold the plurality of inventory items.

12. The method of claim 10, wherein the determined quantities of the at least one of the plurality of different types of inventory items to be disposed on each of the plurality of shelves are based on a preference to group common ones of the plurality of different types of inventory items together on common ones of the plurality of shelves.

13. The method of claim 10, wherein the determining step includes:
   determining, for at least a first shelf of one of the racks, a first quantity of a first of the plurality of different types of inventory items to be disposed on the first shelf and a second quantity of a second of the plurality of different types of inventory items to be disposed on the first shelf.

14. The method of claim 1, further including:
receiving, at the processor of the server, at least a first inventory load object, wherein the first inventory load object includes a total quantity of the plurality of inventory items of the first order object.

15. The method of claim 14, wherein the plurality of inventory items of the first order object includes a plurality of different types of inventory items, and wherein the first inventory load object includes the total quantities of each of the plurality of different types of inventory items.

16. The method of claim 15, further including:
receiving, at the processor of the server, a plurality of inventory load objects, wherein each of the inventory load objects includes total quantities of each of the plurality of different types of inventory items for each of a plurality of inventory order objects, and wherein each of the inventory load objects is associated with one of a plurality of priority numbers;
grouping, using the processor, inventory items of the plurality of inventory load objects having common priority numbers into a plurality of master pull group objects;

identifying, with the processor, for each master pull group object, common instances of the plurality of different types of inventory items of the master pull group object; and generating, with the processor, for each master pull group, a master pull report that includes total quantities of each of the identified common instances of the plurality of different types of inventory item objects in the master pull group object.

17. The method of claim 16, further including:

collecting quantities of inventory items corresponding to the total quantities of the identified common instances of the plurality of different types of inventory item of a first of the plurality of master pull group objects; and loading the collected quantities of inventory items of the first master pull group object onto a vehicle.

18. The method of claim 17, wherein the step of loading the collected quantities of inventory items of the first master pull group object onto a vehicle includes:

loading the collected quantities of inventory items of the first master pull group object onto a plurality of racks; and loading the plurality of racks onto the vehicle.

19. The method of claim 18, wherein the plurality of racks onto which the collected quantities are loaded is the determined total number of racks.

20. The method of claim 18, wherein the step of loading the collected quantities of inventory items of the first master pull group object onto the plurality of racks includes using the rack sheet reports to load the determined quantities of the collected quantities onto the plurality of shelves of the plurality of racks.

21. The method of claim 18, wherein the step of loading the plurality of racks onto the vehicle includes using the rack sheet report to determine a load sequence parameter indicative of a sequence in which the collected quantities of inventory items are loaded onto the vehicle.

22. The method of claim 1, further including:

obtaining a plurality of actual racks corresponding to the determined number of racks according to the generated rack sheet report;

configuring each actual rack with a number of actual shelves corresponding to the determined number of shelves according to the generated rack sheet report;

loading the plurality of inventory items onto the plurality of actual shelves of the plurality of actual racks according to the generated rack sheet report.

23. The method of claim 22, further including:

loading the plurality of actual racks onto a vehicle; and moving the vehicle.

24. The method of claim 23, wherein the vehicle is a truck.

* * * * *